(12) United States Patent
Boguraev et al.

(10) Patent No.: US 10,733,181 B2
(45) Date of Patent: Aug. 4, 2020

(54) NATURAL LANGUAGE PROCESSING BASED ON TEXTUAL POLARITY

(71) Applicant: International Business Machines Corporation, Armonk, NY (US)

(72) Inventors: Branimir K. Boguraev, Bedford, NY (US); Bharath Dandala, White Plains, NY (US); Lakshminarayanan Krishnamurthy, Round Rock, TX (US); Benjamin P. Segal, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 581 days.

(21) Appl. No.: 15/161,321

(22) Filed: May 23, 2016

(65) Prior Publication Data

US 2017/0293677 A1    Oct. 12, 2017

Related U.S. Application Data

(63) Continuation of application No. 15/091,781, filed on Apr. 6, 2016.

(51) Int. Cl.
| | |
|---|---|
| *G06F 17/00* | (2019.01) |
| *G06F 16/242* | (2019.01) |
| *G06N 20/00* | (2019.01) |
| *G06F 16/25* | (2019.01) |
| *G06F 16/33* | (2019.01) |
(Continued)

(52) U.S. Cl.
CPC ........ *G06F 16/243* (2019.01); *G06F 16/2455* (2019.01); *G06F 16/24578* (2019.01); *G06F 16/252* (2019.01); *G06F 16/334* (2019.01); *G06F 16/3344* (2019.01);
(Continued)

(58) Field of Classification Search
CPC ........... G06F 17/30401; G06F 17/3056; G06F 17/3053; G06F 17/277; G06F 17/28; G06F 17/30477; G06F 16/243; G06F 16/3344; G06F 16/252; G06F 16/951;
(Continued)

(56) References Cited

U.S. PATENT DOCUMENTS

| | | |
|---|---|---|
| 7,058,564 B2 | 6/2006 | Ejerhed |
| 8,412,715 B2 | 4/2013 | Asano et al. |
(Continued)

OTHER PUBLICATIONS

Simon Whitehead et al., Generating Shifting Sentiment for a Conventional Agent, Jun. 2010 CAAGET '10: Proceedings of the Computational Linguistics, pp. 89-97, Jun. 2010.*

(Continued)

*Primary Examiner* — Greta L Robinson
(74) *Attorney, Agent, or Firm* — Anthony M. Pallone

(57) ABSTRACT

Natural language processing (NLP) with awareness of textual polarity. An NLP system, such as a search engine or a Question-Answering (QA) system receives input text for processing. The input text may be a text fragment, a search phrase, a question having a general type, or a polar question having a yes or no answer. The NLP system identifies textual polarity and provides responses to the input text (for example, in answer form) based on identifying evidence whose selection, scoring, and processing, is informed by the textual polarity of the input text, and the textual polarity of candidate evidence passages.

7 Claims, 13 Drawing Sheets

(51) Int. Cl.
*G06F 16/951* (2019.01)
*G06F 16/2455* (2019.01)
*G06F 16/2457* (2019.01)
*G06N 5/02* (2006.01)
*G06F 40/284* (2020.01)

(52) U.S. Cl.
CPC .......... *G06F 16/951* (2019.01); *G06F 40/284* (2020.01); *G06N 5/025* (2013.01); *G06N 20/00* (2019.01)

(58) Field of Classification Search
CPC .............. G06F 16/334; G06F 16/24578; G06F 16/2455; G06N 20/00; G06N 5/025
USPC ............... 707/723, 730, 736, 739, 748, 769; 706/12, 14; 704/9
See application file for complete search history.

(56) References Cited

U.S. PATENT DOCUMENTS

| | | | |
|---|---|---|---|
| 8,543,565 | B2 | 9/2013 | Feng |
| 9,204,098 | B1 | 12/2015 | Cunico |
| 2004/0122816 | A1* | 6/2004 | Kirkland ............. G06F 16/3322 |
| 2005/0004922 | A1 | 1/2005 | Zernik |
| 2006/0069589 | A1 | 3/2006 | Nigam et al. |
| 2006/0080305 | A1 | 4/2006 | Dill et al. |
| 2009/0182549 | A1 | 7/2009 | Anisimovich et al. |
| 2009/0287678 | A1 | 11/2009 | Brown et al. |
| 2010/0211567 | A1 | 8/2010 | Abir |
| 2011/0066587 | A1 | 3/2011 | Ferrucci et al. |
| 2011/0320498 | A1 | 12/2011 | Flor |
| 2012/0245923 | A1* | 9/2012 | Brun ................... G06F 17/2735 704/9 |
| 2013/0035931 | A1* | 2/2013 | Ferrucci ............ G06F 16/90332 704/9 |
| 2013/0325440 | A1 | 12/2013 | Kim et al. |
| 2014/0067368 | A1* | 3/2014 | Yih ................... G06F 17/30672 704/9 |
| 2014/0324825 | A1 | 10/2014 | Gopinath et al. |
| 2014/0379324 | A1 | 12/2014 | Klapaftis |
| 2015/0026106 | A1 | 1/2015 | Oh et al. |
| 2015/0039296 | A1 | 2/2015 | Hashimoto et al. |
| 2015/0186515 | A1 | 7/2015 | Rao et al. |
| 2016/0140217 | A1 | 5/2016 | Sano et al. |
| 2016/0171386 | A1 | 6/2016 | Brun |
| 2016/0321244 | A1* | 11/2016 | Hashimoto ......... G06F 17/2785 |

OTHER PUBLICATIONS

IBM: List of IBM Patents or Patent Applications Treated as Related (Appendix P), May 24, 2016, pp. 1-2.

Boguraev et al., Pending U.S. Appl. No. 15/091,775, filed Apr. 6, 2016, titled "Natural Language Processing Based on Textual Polarity,", pp. 1-72.

Boguraev et al., Pending U.S. Appl. No. 15/091,790, filed Apr. 6, 2016, titled "Natural Language Processing Based on Textual Polarity,", pp. 1-71.

Boguraev et al., Pending U.S. Appl. No. 15/091,781, filed Apr. 6, 2016, titled "Natural Language Processing Based on Textual Polarity,", pp. 1-70.

Boguraev et al., Pending U.S. Appl. No. 15/161,333, filed May 23, 2016, titled "Natural Language Processing Based on Textual Polarity,", pp. 1-70.

Boguraev et al., Pending U.S. Appl. No. 15/162,643, filed May 24, 2016, titled "Natural Language Processing Based on Textual Polarity,", pp. 1-67.

Gondek et al., "A Framework for Merging and Ranking of Answers in DeepQA", IBM J. Res. & Dev. vol. 56, No. 314 Paper 14, May/Jul. 2012, 11 pages.

Green et al., "Generating Indirect Answers to Yes-No Questions", 7th International Generation Workshop, Kennebunkport, ME, Jun. 21-24, 1994, pp. 189-198.

Hirschberg, "Toward a Redefinition of Yes/No Questions", ACL 1984 Proceedings of the 10th International Conference on Computational Linguistics and 22nd Meeting on Associationfor Computational Linguistics, pp. 48-51.

Kanayama et al. "Answering Yes/No Questions via Question Inversion", Proceedings of COLING 2012: Technical Papers, Coling, 2012, Mumbai, Dec. 2012, pp. 1377-1392.

Mayfield, "Evaluating Plan Recognition Systems: Three Properties of a Good Explanation", Artificial Intelligence Review 14: 2000, pp. 351-376.

Murdock, "Textual Evidence Gathering and Analysis", IBM J. Res & Dev. vol. 56, No. 3/4, Paper 8, May/Jul. 2012, pp. 8:1-8:14.

Wang, "A Survey of Answer Extraction Techniques in Factoid Question Answering", 2006 Association for Computational Linguistics, pp. 1-14.

Mohtarami et al., "Predicting the Uncertainty of Sentiment Adjectives in Indirect Answers", CIKM'11, Oct. 24-28, 2011, Glasgow, Scotland, UK, pp. 1-4.

Bolinger, "Yes-No Questions Are Not Alternative Questions", Copyright 1978 by D. Reidel Publishing Company, Dordrecht, Holland, 11 pages.

Hockey et al., "Can You Predict Responses to Yes/No Questions? Yes, No and Stuff," Fifth European Conference on Speech Communication and Technology, EUROSPEECH 1997 Rhodes, Greece, Sep. 22-25, 1997, pp. 1-4.

Mell et al., "The NIST Definition of Cloud Computing," National Institute of Standards and Technology, U.S. Department of Commerce, Special Publication 800-145, Sep. 2011, pp. 1-7.

Whitehead et al., "Generating Shifting Sentiment for a Conversational Agent", Proceedings of the NAACL HLT 2010 Workshop on Computational Approaches to Analysis and Generation of Emotion in Text, Jun. 2010, pp. 89-97.

* cited by examiner

NATURAL LANGUAGE PROCESSING BASED ON TEXTUAL POLARITY

BACKGROUND

Embodiments of the invention generally relate to electronic natural language processing, and more particularly, to natural language processing based on textual polarity.

Generally, natural language processing (NLP) systems are designed to process unstructured data in natural language form. NLP systems seek to bridge the gap between the processing power of computers and the variable nature of natural language expression. Search engines and Question-Answering systems are two classes of NLP systems.

Search engines traditionally operate based on matching key terms in a search phrase to terms in a reference document (for example, a webpage). The matching may be enhanced by using Boolean search operators, wildcard characters, or the like. In this model, a search result is generally deemed relevant to a search phrase if there is close mapping of words in the search phrase to words in the search result. The search engine generally ignores the disparate impact that a given word may have on the meaning of the search phrase as a whole, or on the meaning of a mapped phrase in a search result. For example, in response to receiving the search phrase "first president of the United States," a traditional search engine may rank the following results closely to one another: "George Washington was the first president of the United States," and "George Washington was not the first president of the United States." While the two search results are substantially similar (they share ten words appearing in the same sequence with the exception of "not" in the second sentence), they convey completely opposite meanings. The search engine likely presents both sentences as highly relevant in its search results, even though at least one of the two sentences is wrong.

Question-answering (QA) systems generally are designed to receive a natural language question input, analyze the question to determine its meaning beyond the mere words used in the question, and generate a natural language answer to the question. For example, in a typical QA use-case, the QA system receives a natural language question from a user. The likelihood that the QA system arrives at a correct answer to the question can be improved by categorizing the question into a known question type, and by employing special techniques that take advantage of known properties of the question type, and known properties of likely answers to that question type.

SUMMARY

Embodiments of the invention generally provide NLP solutions based on textual polarity.

According to an embodiment of the invention, a method for performing a textual query by a search engine receives an electronic input text and identifies a polarity value of the electronic input text based on an element of the electronic input text. The method generates a modified electronic input text by replacing the element with a lexical substitute. The method searches a database using at least one portion of the electronic input text or the modified electronic input text, or both, as a query, and receives search results based on the searching.

According to a further embodiment, the method ranks the received search results relative to one another.

According to a further embodiment, the ranking is based on the polarity value of the electronic input text relative to polarity values of the received search results.

According to a further embodiment, the method excludes from search results at least one search result having a polarity value that is opposite to the polarity value of the electronic input text.

According to a further embodiment, identifying the polarity value of the electronic input text is based on detecting a polar word in the electronic input text based on the polar word matching at least one criterion for a polar term, and further based on identifying the polarity value of the electronic input text based on the detecting.

According to a further embodiment, identifying the polarity value of the electronic input text is based on generating a predicate-argument structure (PAS) for the electronic input text, comparing a pattern in the PAS to one or more patterns in a set of pattern matching rules, the set of pattern matching rules including predetermined PAS patterns, and further based on identifying at least one polar word based on the comparing resulting in a match between the pattern in the PAS to at least one of the one or more patterns in the set of pattern matching rules.

According to a further embodiment, the method queries a database using one or more words in the electronic input text, and receives one or more candidate passages in response to the query. The method scores the one or more candidate passages.

An embodiment of the invention provides a computer program product for performing a textual query by a search engine. The computer program product includes a non-transitory tangible storage device having program code embodied therewith. The program code is executable by a processor of a computer to perform a method. The method receives, by the processor, an electronic input text, identifies a polarity value of the electronic input text based on an element of the electronic input text, and generates a modified electronic input text by replacing the element with a lexical substitute. The method further searches, by the processor, a database using at least one portion of the electronic input text or the modified electronic input text, or both, as a query, and receives search results based on the searching.

An embodiment of the invention provides a computer system for performing a textual query by a search engine. The system includes one or more computer devices each having one or more processors and one or more tangible storage devices, and a program embodied on at least one of the one or more storage devices. The program includes a plurality of program instructions for execution by the one or more processors. The program instructions include instructions for receiving an electronic input text, identifying a polarity value of the electronic input text based on an element of the electronic input text, generating a modified electronic input text by replacing the element with a lexical substitute, searching a database using at least one portion of the electronic input text or the modified electronic input text, or both, as a query, and receiving search results based on the searching.

DETAILED DESCRIPTION

Figure 1:
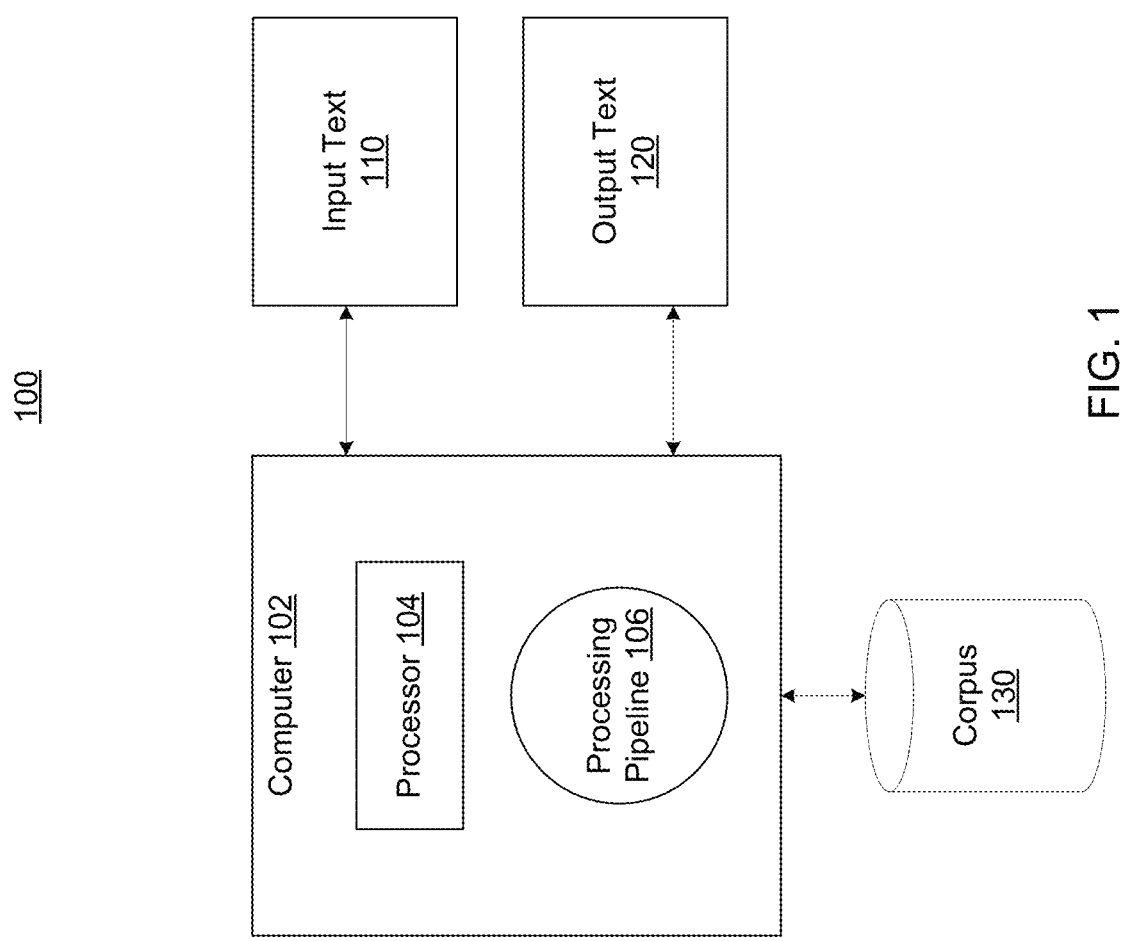
FIG. 1 is a functional block diagram of a natural language processing (NLP) computing environment, according to an embodiment of the invention.

Embodiments of the invention are directed to natural language processing (NLP) techniques based on textual polarity implemented in one or more processing environments. According to an aspect of the invention, various NLP techniques based on textual polarity may be implemented via a polarity-detection processing pipeline in a multistage, parallel processing system, as described in connection with various embodiments of the invention, below. More specific embodiments of the invention are directed to data processing pipelines using NLP techniques based on textual polarity in the context of question-answering (QA) systems (including QA processing pipelines), and in the context of search engines.

Accordingly, any NLP system or NLP pipeline may take advantage of special properties of a given polar text to tailor its processing based on the nature of the polar text. Therefore, while some embodiments of the invention, described below, reference a specific NLP system, QA system, or search engine, it shall be apparent to a person of ordinary skill in the art that the described NLP techniques and functionalities are applicable across these systems, unless otherwise specified.

The following are some illustrative and non-limiting definitions of textual polarity. According to one definition, textual polarity, or the polar value of a given text, refers to a property in natural language text where one or more text elements (for example, one or more words in the sentence) operate to give a meaning to the text, where the meaning is associated with a range, continuum, enumeration, or spectrum of meaning. For example, in the sentence "the weather is scorching," one meaning of the word "scorching" is "hot". The word "hot" may be defined as part of a set of words having a range or spectrum of meaning, such as {freezing, cold, neutral, warm, hot}. In this context, the words in the word set describe temperature.

Under a further definition, textual polarity refers to a property in natural language text where replacing one or more elements in the text with one or more other text elements operates to change the text's meaning along a range, continuum, or spectrum of meaning. For example, in the sentence "the water is cloudy," changing the word "cloudy" to "clear" changes the sentence's meaning as to the water's turbidity (i.e., along a visibility range).

Under a further definition, textual polarity refers to a property in natural language text where one or more text elements are associated with a meaning, where the meaning is, or can be defined to have, an opposite meaning (for example, antonyms). For example, in the sentence "the man is deceased", changing the word "deceased" to "alive" causes the sentence to have an opposite meaning, without necessarily involving a range. The words "deceased" and "alive" may be defined as antonyms (their antonymic relationship may be defined in a dictionary, or ascertained from how they are used in natural language texts).

Under yet a further embodiment, textual polarity refers to the classification of a given natural language text, evaluated as a proposition or statement, based on the given text being correct or incorrect, true or false, or based on the text being interpretable as a question having a yes or no answer. For example, questions beginning with "is/are/can" may have yes or no answers; changing one word in the question may change the answer from a yes to a no, or vice versa. For example, assuming that the answer to the question "is today your daughter's birthday?" is yes, changing either one of "today" to "tomorrow", or "your daughter's" to "your son's", may change the answer to a no. These question types are described in greater detail below, in connection with embodiments of the invention.

Polarity-Aware NLP Systems in General.

According to an aspect of the invention, a polarity-aware NLP system detects textual polarity in text, including natural language text. Detecting textual polarity can be used to trigger a set of specialized and use-dependent processing techniques that improve natural language processing outcomes, by identifying and exploiting latent polar textual features that are unappreciated and unexploited by prior art solutions.

In one aspect of the invention, identifying a given text's textual polarity informs decisions about the relevance and utility of reference texts, each of which may have its own polarity, in a processing pipeline, thereby adding a processing dimension to NLP technology that is absent in the prior art. For example, while two pieces of text may appear, when evaluated by prior art solutions, to be highly relevant (for example, if they share a sufficiently high number of keywords), the two texts may nevertheless be complete opposites and highly irrelevant in light of their individual polarity. Consider, for example, the following two sentences (presented here in question form): "What is the cause of an elevated B12 when the patient is not on a supplement"; and "What are the treatment guidelines for high cholesterol?" In these two examples, the words elevated and high qualify as polar terms under at least one of the definitions of polar terms provided above, because changing each with its antonym potentially leads to an opposite answer. Under traditional NLP techniques, textual passages containing the words B12 and supplement may be deemed highly relevant to the first question; and textual passages containing the words treatment and cholesterol may be deemed highly relevant to the second question. However, traditional NLP techniques do not distinguish between passages that discuss elevated levels of B12 versus B12 deficiency; they do not distinguish between high cholesterol and low cholesterol.

Embodiments of the invention, on the other hand, appreciate that polarity is a feature of some natural language text that can inform processing decisions in a variety of NLP system use-cases. Some of these embodiments will now be generally discussed.

In an embodiment, the NLP system detects textual polarity shifts, i.e., polar differences between a given text under analysis and a reference text. Consider, for example, a traditional QA system or search engine that does not detect textual polarity shifts. Based on receiving a question or query containing "elevated B12", the traditional system retrieves and uses results that include references to "low B12", and may not distinguish them from results that refer to "elevated B12". Therefore, a result that is highly irrelevant and misleading is nevertheless identified as a valuable reference text in the NLP system's analysis. In the case of QA systems in particular, where evidence passages are retrieved and scored, highly irrelevant passages may nevertheless receive high relevance scores because they frequently reference words in the given text. In the case of search engines, highly irrelevant results may appear as top ranking results. Embodiments of the invention, on the other hand, detect polar shifts between a given text and reference texts; each text's polarity influences the NPL system's analysis. The NLP system is much more likely to exclude from consideration, or to limit the influence of reference passages that, while sharing certain properties with the given text (such as keywords), are nevertheless polar opposites to the given text.

Consider a further example that illustrates detecting textual polarity shifts. The following first sentence might appear in an electronic patient record: "There is underlying ischemic cardiomyopathy." The following second sentence may appear in a treatment guidelines database: "Those with non-ischemic dilated cardiomyopathy (NIDCM) qualify for . . . ". It is important for the NLP system to detect the polar nature of the word ischemic, when judging the relevance of the first sentence in the patient record to the second sentence in the treatment guidelines database. Here, detecting that ischemic is a polar term in the first sentence, that non-ischemic is a polar term in the second sentence, and that one causes a polarity shift of the overall sentence with respect to the other sentence, significantly impacts the relevance of the sentences to one another. Without appreciation of textual polarity in general, and polarity shift detection in particular, the NLP system may treat the example sentences as relevant, when in fact they are not relevant, and where any matching between them may even be highly misleading.

In a further embodiment, the NLP system detects textual negation, i.e., characterizing a given text as a proposition, and identifying a negating element that defines the scope of that proposition. Consider, for example, the question "What treatment should I look for in patients with schizophrenia who have not responded to Drug A?" The phrase not responded to is indicative of the scope of a proposition "patients not respond to Drug A", which must be matched with all of its components to excerpts from background content. Partly, it is important to match polarity, in addition to the predication alone. Additionally, it is important to understand the scope (or targets) of a particular polarity-laden statement. In the case of the above example, it would be undesirable to retrieve a passage and align it to the question merely because the passage includes the phrase "little or no response." Indiscriminately aligning such a passage with the example question may be particularly undesirable, for example, if the passage contains " . . . little or no response to 2 other antipsychotic trials . . . ".

Polarity in QA systems. In the context of a QA system, a polar question may be defined as one whose answer is yes or no (this assumes the answer is known; functionally, an NLP system can define a third answer, "don't know", which indicates that the NLP system's confidence that the answer is yes or no falls bellow a predetermined threshold confidence value). Polar questions have certain properties that differentiate them from factoid questions. Broadly speaking, a factoid question is one that has a short answer, typically a noun phrase or a verb phrase. QA processes that focus on answering factoid questions rely on finding instances of the correct answer to the factoid question in background corpora (a collection of text). An example of a factoid question is, "who was the first president of the United States," having the answer "George Washington."

Answering a factoid question relies on a general assumption that the answer to the factoid question is stated in background corpora in several ways, in different contexts, and in multiple instances. However, this assumption is less reliable in the case of polar questions, since in many circumstances, the answer to a polar question is unlikely to appear in the background corpora. Consider, for example, the following two illustrative polar questions, which will serve as references in discussing embodiments of the invention (note that the likely polar word in each question is italicized):

Question 1: "are vipers *poisonous*?" (answer: yes)
Question 2: "is making molten glass a *chemical* change?" (answer: no)

Assuming a QA framework (or more generally, an NLP framework) where candidate answers are proposed from fragments of background content, which match queries appropriately derived from the question, a challenge in answering Questions 1-2 can be illustrated by considering how much more likely it is to find a supporting statement for questions whose answer is yes, as compared with finding a statement that explicitly supports a no answer. In the case of Question 1, for example, it is likely that the following statement, referred to as Statement 1, exists in one or more formulations: "vipers are a family of poisonous snakes." Such a statement would constitute supporting evidence for the hypothesis pair of {Question 1, Statement 1} (hypothesis generation, evidence gathering, and evidence scoring in a QA processing pipeline are described below in connection with FIGS. 2 and 3). At the same time, it is harder to imagine finding a source that explicitly states that "melting glass is not a chemical change" (this may be referred to as Statement 2), which, if found, would constitute supporting evidence for a no answer for the hypothesis pair of {Question 2, Statement 2}.

Accordingly, in some embodiments of the invention, aspects of a QA system are implemented for answering a polar question, based on minimizing, or even obviating, the difference between evidence in the positive and in the negative. If the correct answer to a polar question is yes, the QA system can assume there will be supporting evidence for the polar question's underlying proposition. If the answer to the polar question is no—and consequently, supporting evidence would a priori be hard to find—the system can seek supporting evidence for the opposite polar question. Given the polar nature of yes-no questions, the opposite of a polar question may be defined as a polar question capturing essentially the same proposition, but stated in a way such that the answer to the opposite polar question is the reverse of the answer to the original polar question. In the case of Questions 1-2, above, the opposite polar questions may be the following questions, annotated with the subscript "f" which identifies them as "flipped" versions of a polar opposite question (note that the likely polar word in each question is italicized):

Question $1_f$: "are vipers non-*poisonous*?" (answer: no)

Question $2_f$: "is making molten glass a *physical* change?" (answer: yes)

It should be noted that polar questions are only one of several polar text types that can be evaluated using embodiments of the invention. For example, the statement "vipers are poisonous" is a polar proposition that can be determined to be true or false, or correct or incorrect, where sufficient evidence exists; in this case true/correct. Therefore, although some embodiments of the invention are described in connection with polar questions, the NLP techniques involved are equally applicable to other polar text types.

Polarity in Search Engines.

Polarity awareness in the context of a search engine encompasses many of the same concepts and techniques discussed with respect to textual polarity detection in general, and QA systems in particular. However, search engines need not operate based on a parallel processing pipeline, such as those described in connection with FIGS. 2-3, below. Rather, polarity detection may (but need not) be implemented as standalone processing programming functions that a search engine may call upon. In a related embodiment, polarity detection may be provided as a web service callable via an application programming interface (API).

Embodiments of the invention will now be described in connection with the Figures. FIG. 1 is a functional block diagram of a natural language processing (NLP) computing environment 100, according to an embodiment of the invention. NLP computing environment 100 includes a computer 102 having a processor 104, and at least one program 106 stored on a tangible storage device of computer 102. Instructions of program 106 are executable by processor 104. Additional details of the physical structure and configuration of these components, according to embodiments of the invention, are provided in connection with FIG. 8, below.

Generally, computer 102 receives an electronic input text 110 (for example, from a user) and provides one or more output texts 120 in response to receiving electronic text input 110. In one embodiment, the received electronic text input may be in the form of a proposition, and text provided in response may be in the form of an assessment of that proposition (for example, the proposition may be true or false). Alternatively, input text 110 is in question form, and output text 120 is in answer form. A question may have one or more answers, and an answer may be responsive to one or more questions. This is for illustration purposes only, and does not limit embodiments of the invention; the received electronic text input need not be a question, and the text provided in response need not be an answer. In providing output text 120 based on input text 110, computer 102 may use natural language texts stored in corpus 130. These texts can be used, for example, to analyze the question, and to generate candidate answers.

NLP computing environment 100 includes at least one processing pipeline 106. Processing pipeline 106 includes programming instructions that may be organized (physically or functionally) as a set of processing stages that process input text 110 and generate output text 120. In one example, processing pipeline 106 includes one or more of QA processing pipeline 200 (FIG. 2), QA processing pipeline 300 (FIG. 3), and other processing pipelines.

With continued reference to FIG. 1, in an embodiment, computer 102 is a computing node in a multi-node, distributed computing environment, such as a cloud-computing environment, as described in connection with FIGS. 8-10, below. Processing pipeline 106, including QA processing pipeline 200 and QA processing pipeline 300, are deployable on multiple computing nodes in the distributed computing environment.

Figure 2:
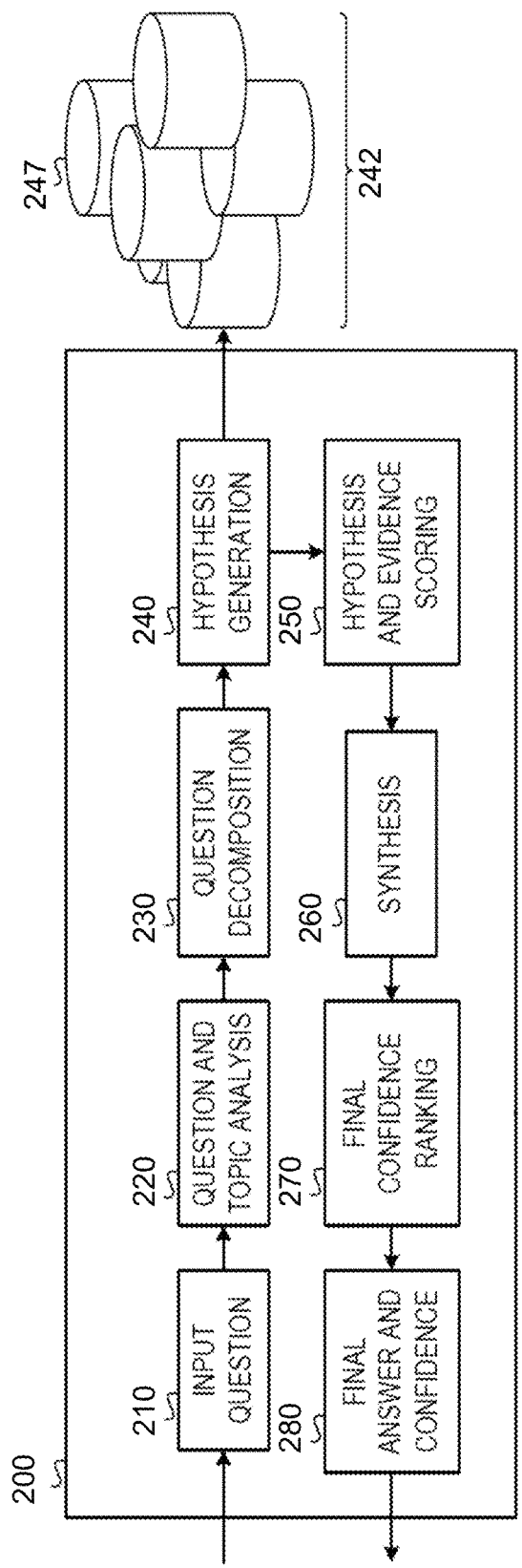
FIG. 2 is a functional block diagram of a question-answering (QA) system for answering a natural language question, in the NLP computing environment of FIG. 1, according to an embodiment of the invention.

FIG. 2 is a functional block diagram of a question-answering (QA) processing pipeline 200 for answering a natural language question, in NLP computing environment 100 of FIG. 1, according to an embodiment of the invention.

Referring now to FIG. 2, QA processing pipeline 200 processes an input question in accordance with one illustrative embodiment. It should be appreciated that the stages of QA Processing Pipeline 200 shown in FIG. 2 are implemented as one or more software engines, components, or the like, which are configured with logic for implementing the functionality attributed to the particular stage. Each stage is implemented using one or more of such software engines, components or the like. The software engines, components, etc., are executed on one or more processors of one or more data processing systems or devices and utilize or operate on data stored in one or more data storage devices, memories, or the like, on one or more of the data processing systems (such as computer 102 in FIG. 1). QA processing pipeline 200 of FIG. 2 may be augmented, for example, in one or more of the stages to implement the improved mechanism of the illustrative embodiments described hereafter. Additional stages may be provided to implement the improved mechanism, or separate logic from QA processing pipeline 200 may be provided for interfacing with QA processing pipeline 200 and implementing the improved functionality and operations of the illustrative embodiments. Significantly, although processing stages 210-280 are illustrated in sequential form, they need not interact in the particular sequence shown, unless specifically specified. Furthermore, as QA processing pipeline 200 is deployable in several instances and threads, and is deployable on multiple computing nodes, many of the processing stages 210-280 may operate simultaneously or in parallel.

As shown in FIG. 2, QA processing pipeline 200 includes a set of stages 210-280 through which QA processing pipeline 200 operates to analyze an input question and generate a final response. In a question input stage 210, QA processing pipeline 200 receives an input question (for example, input text 110 in FIG. 1) that is presented in a natural language format. For example, a user inputs, via a user interface, an input question for which the user wishes to obtain an answer, e.g., "Who are Washington's closest advisors?" In response to receiving the input question, the next stage of QA processing pipeline 200, i.e. the question and topic analysis stage 220, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1100s to speed up the game and involves two pieces of the same color?", the LAT is the string "maneuver." The focus of a question is the part of the question that, if replaced by the answer, makes the question a standalone statement. For example, in the question "What drug has been shown to relieve the symptoms of ADD with relatively few side effects?", the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT.

With continued reference to FIG. 2, the identified major features are then used during the question decomposition stage 230 to decompose the question into one or more queries that are applied to the corpora of data/information 242 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 242. That is, these various sources themselves, different collections of sources, and the like, represent a different corpus 247 within the corpora 242. There may be different corpora 247 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Any collection of content having some similar attribute may be considered to be a corpus 247 within the corpora 242.

The queries are applied to one or more databases storing information about the electronic texts, documents, articles, websites, and the like, that make up the corpus of data/information. The queries are applied to the corpus of data/information at the hypothesis generation stage 240 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 240, to generate hypotheses for answering the input question. These hypotheses are also referred to herein as "candidate answers" for the input question. For any input question, at this stage 240, there may be hundreds of hypotheses or candidate answers generated that may need to be evaluated.

QA processing pipeline 200, in stage 250, performs a deep analysis and comparison of the language of the input question and the language of each hypothesis or "candidate answer," and performs evidence scoring to evaluate the likelihood that the particular hypothesis is a correct answer for the input question. This involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexities may be used to generate scores for candidate answers and evidence without departing from the spirit and scope of the present invention.

In the synthesis stage 260, the large number of scores generated by the various reasoning algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence ranking stage 270, which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers. From the ranked listing of candidate answers, at stage 280, a final answer and confidence score, or final set of candidate answers and confidence scores, are generated and output to the submitter of the original input question via a graphical user interface or other mechanism for outputting information.

Figure 3:
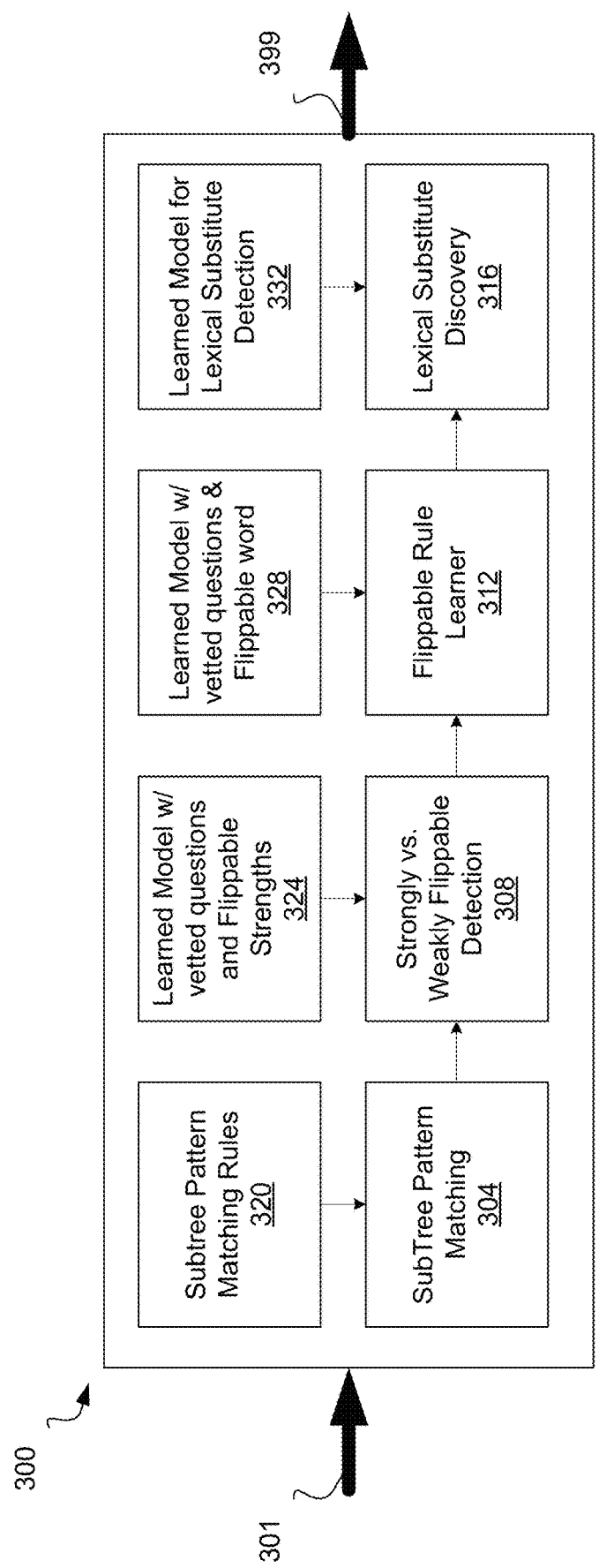
FIG. 3 is a functional block diagram of a processing pipeline for answering a polar natural language question, in the QA system of FIG. 2, according to an embodiment of the invention.

FIG. 3 is a functional block diagram of a QA processing pipeline 300 for answering a natural language polar question, according to an embodiment of the invention. QA processing pipeline 300 is deployable on one or more computing nodes, such as part of processing pipeline 106 of computer 102 described in connection with FIG. 1. QA processing pipeline 300 can be implemented via one or more programming instructions. In an embodiment, QA processing pipeline 300 is an extension of QA processing pipeline 200 of FIG. 2.

Referring now to FIG. 3, QA processing pipeline 300 generally includes processing stages 304-332. In an embodiment, QA processing pipeline 300 receives, as input 301, an output of QA processing pipeline 200 at stage 210 (FIG. 2). In other embodiments, QA processing pipeline 300 receives an output of one or more other stages in QA processing pipeline 200. In turn, QA processing pipeline 300 generates an output 399 to a processing stage of QA processing pipeline 200, such as question and topic analysis stage 220 (or another stage).

A processing stage in QA processing pipeline 200 or QA processing pipeline 300 may identify a question as a polar question. In general, a question is polar at least if it matches one of the definitions of a polar question. For example, the question may include a word or phrase that is associated with a range, continuum, or spectrum of meaning. In a further embodiment, the question may be one of a known question type, as determined by a machine learning engine. In a further embodiment, the question may be one having a word or phrase with a known antonym. In yet a further embodiment, the identification may be based on the question matching a set of predefined patterns for polar questions. For example, a question may be identified as a polar question if it begins with "does/do", "is/are", "can/could", "would", or "should", or if it includes a phrase such as "is that true?" or "do you agree that . . . ". Other criteria may be applied to the question to identify it as a polar question.

QA processing pipeline 300 includes, in the depicted embodiment, the following stages: a sub-tree pattern matching stage 304 (informed by sub-tree pattern matching rules 320); strong-versus-weak flippable detection stage 308 (informed by learned models 324 with vetted questions and flippable strengths); a flippable rule finder stage 312 (informed by learned models 328 with vetted questions and flippable words); and an n-gram based lexical substitute discovery stage 316 (informed by learned models 332 with selected n-gram patterns).

Sub-Tree Pattern Matching Stage 304 ("Stage 304"):

Generally, stage 304 includes a list of rules for identifying flippable words in a polar question. In an embodiment, stage 304 uses sub-tree matching to examine patterns of constituent elements of a polar question as reflected in the polar question's predicate-argument-structure (PAS) generated by a PAS builder, based on parse trees generated from the polar question. The PAS structure contains nodes (vertices), with one or more properties on each node, and edges (links between vertices) having labels. Rules 320 refer to the rules uses to identify one or more words in the PAS as a "flippable" word; i.e., a word whose opposite, when used in the polar question in lieu of the word, reverses the polar question's polarity (for example, from a physical change to a chemical change, or vice versa). TABLE 1 provides a series of illustrative rules. In these rules, sub-tree patterns are defined in terms of the PAS structure for a polar question. The patterns seek to identify syntactic contexts in which appropriate lexical substitution alters the polarity of the basic question/statement proposition. The notations in TABLE 1 are as follows: square brackets constrain properties of nodes/vertices, and braces are used for edges; for example, Vertex1[featureslist constraints]{edgelabel→Vertex2[featureslist] }; a further example, Vertex1 [featureslist] constraints]{edgelabel1→Vertex2 [featureslist] }{edgelabel2→Vertext3 [featureslist]}.

TABLE 1

EXAMPLES OF SUB-TREE PATTERN MATCHING RULES 320

Rule 1
root=qPolarBeNounAdj->
node0[hasParseSlotName(\"top\"),!hasParseFeature(\"wh\"),hasLemmaFormFromList(\"be\",\"do\",\"can\")]
   {subj -> node1[hasPartOfSpeech(\"noun\")]}
   {pred -> node2[hasPartOfSpeech(\"adj\")]}
Rule 2
root=qPolarBeNounNoun->
node0[hasParseSlotName(\"top\"),!hasParseFeature(\"wh\"),hasLemmaFormFromList(\"be\",\"do\",\"can\")]
   {subj -> node1[hasPartOfSpeech(\"noun\")]}
   {pred -> node2[hasPartOfSpeech(\"noun\")]{mod_nnoun -> NULL}{mod_nadj -> NULL}}
Rule 3

TABLE 1-continued

EXAMPLES OF SUB-TREE PATTERN MATCHING RULES 320 root=qPolarBeNounNounWithModifier->
node0[hasParseSlotName(\"top\"),!hasParseFeature(\"wh\"),hasLemmaFormFromList(\"be\",\"do\",\"can\")]
   {subj -> node1[hasPartOfSpeech(\"noun\")]}
   {pred -> node2[hasPartOfSpeech(\"noun\")]{mod_nnoun -> node3[ ]}}
Rule 4
root=qPolarBeSubjPredModAdj->
node0[hasParseSlotName(\"top\"),!hasParseFeature(\"wh\"),hasLemmaFormFromList(\"be\",\"do\",\"can\")]
   {subj -> node1[hasPartOfSpeech(\"pron\"),hasLemmaForm(\"it\")] {mod_nadj-
>node2[hasPartOfSpeech(\"adj\")]}
   {pred -> node2[hasPartOfSpeech(\"adj\")]}
Rule 5
root=qPolarBePredNAdj->
node0[hasParseSlotName(\"top\"),!hasParseFeature(\"wh\"),hasLemmaFormFromList(\"be\",\"do\",\"can\")]
   {pred -> node1[hasPartOfSpeech(\"noun\")]{mod_nadj->node3[ ]}}
Rule 6
root=qPolarBeSubjVerbAdvEnd->
node0[hasParseSlotName(\"top\"),!hasParseFeature(\"wh\"),hasLemmaFormFromList(\"do\",\"be\",\"can\")]
   {auxcomp -> node1[hasPartOfSpeech(\"verb\")]{mod_vadv -> node2[hasPartOfSpeech(\"adv\")]}}

Figure 3A:
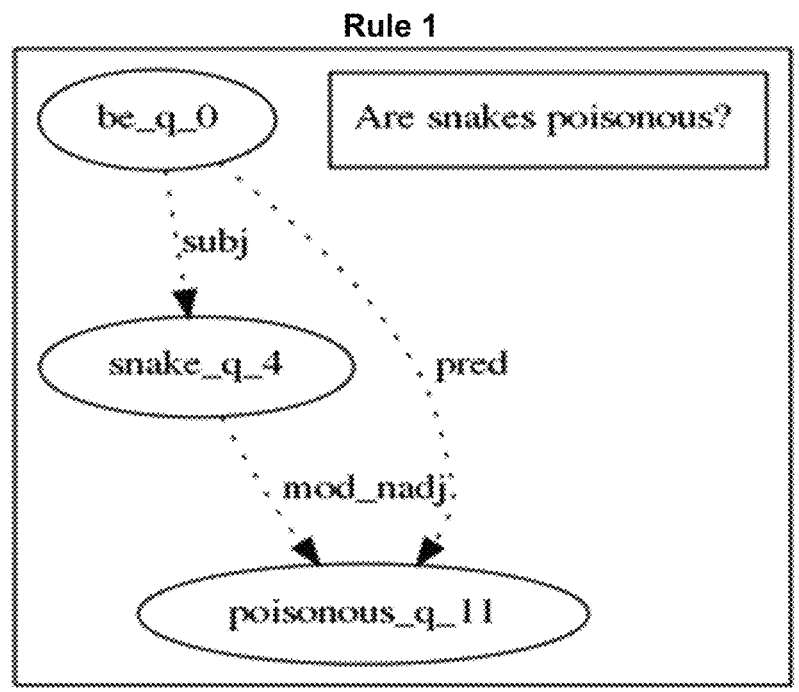
FIGS. 3A-E depict illustrative examples of parse trees for a set of sentences, generated by a processing stage of the processing pipeline of FIG. 3, according to an embodiment of the invention.
Figure 3B:
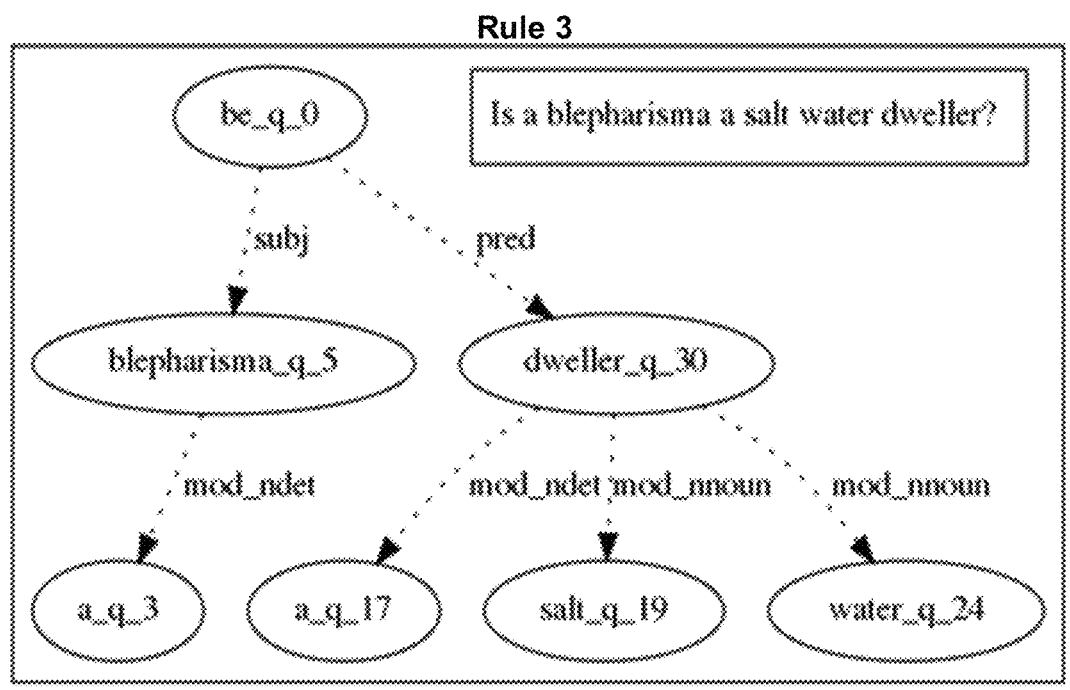
Figure 3C:
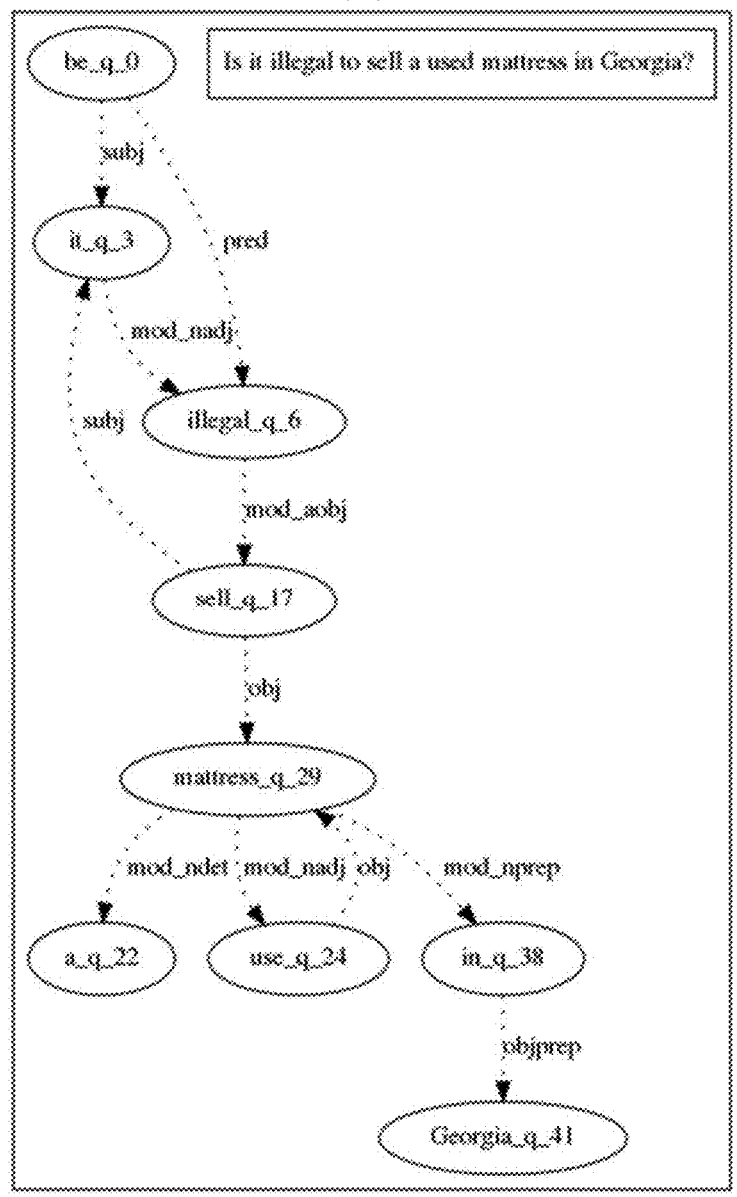
Figure 3D:
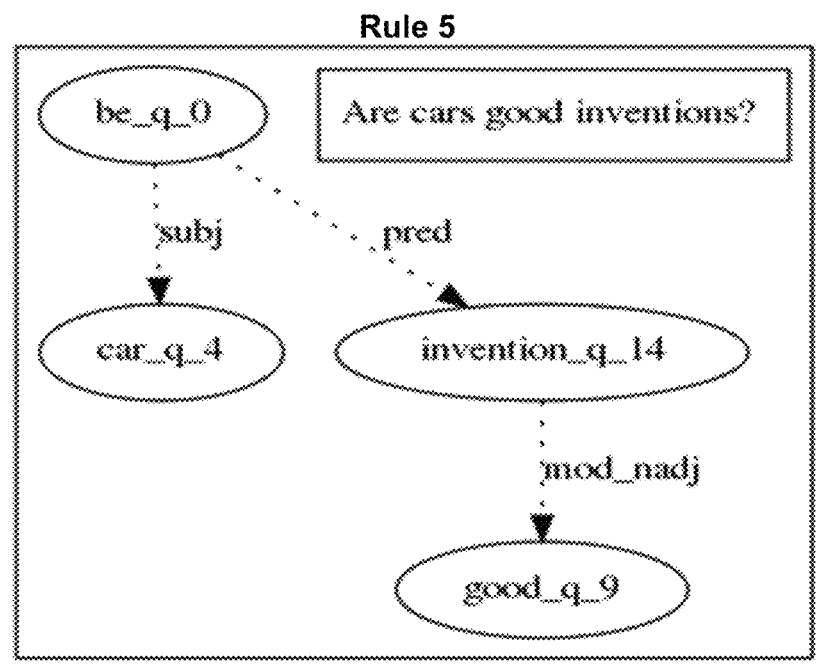
Figure 3E:
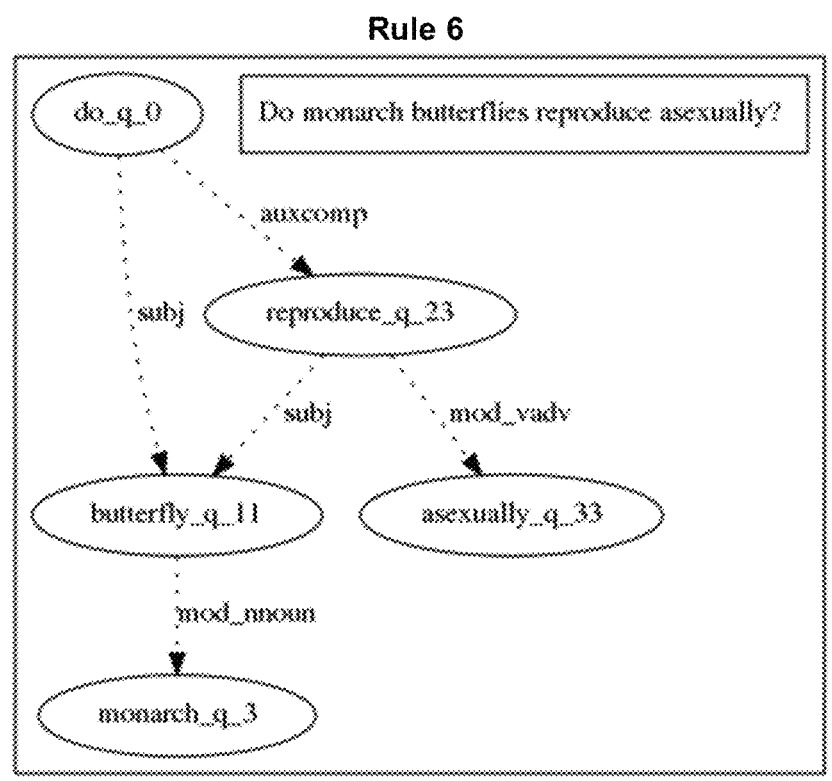

In TABLE 1, Rule 1 looks for a sentence that satisfies three conditions. The first condition, beginning with node0 [hasParseSlotName("top"), looks for a node in a PAS structure whose feature pattern has the following three features: the node's parse slot name is "top", the parse feature is not "wh", and the parse feature has the lema form "be", "do", or "can". The second condition {subj→node1[hasPartOfSpeech("noun")]} looks for an edge from Node 0 to Node 1, where the edge's label is "subj". The third condition {pred- →node2[hasPartOfSpeech("adj")]} looks for Node 0 having a predicate edge to Node 2, where Node 2 is an adjective. Consider an example sentence, in question form, that satisfies Rule 1: "are snakes poisonous?" FIG. 3A illustrates an example of the PAS structure for this sentence, according to an embodiment of the invention, where the nodes are: "Are"=node0, "snakes"=node1, "poisonous"=node2.

In TABLE 1, Rule 2 is defined as follows. The first condition node0[hasParseSlotName("top"),!hasParseFeature("wh"),hasLemmaFormFromList("be","do","can")] looks for a node that has three features: the parse slot name is "top", the parse feature is not "wh", and it has a lemma form "be" or "do" or "can". The second condition {subj→node1[hasPartOfSpeech("noun")]} looks for an edge with the label "subject" from Node 0 to Node 1, where Node 1 has part of speech "noun". The third condition {pred- →node2[hasPartOfSpeech("noun")] {mod_nnoun→NULL}{mod_nadj→NULL}} looks for an edge with the label "predicate" from Node 0 to Node 2, with part of speech "noun". Node 2 should not contain modifier adjectives or modifier nouns.

Rule 2 is not shown in connection with an exemplary PAS structure. However, FIGS. 3B, 3C, 3D, and 3E depict PAS structures for illustrative sentences that satisfy one of Rules 3-6, respectively. The sentences in FIGS. 3B-E are, respectively: "Is a blepharisma a salt water dweller?", "Is it illegal to sell a used mattress in Georgia?", "Are cars good inventions", and "Do monarch butterflies reproduce asexually?".

With continued reference to FIG. 3, since more than one rule 320 may be used to identify a flippable word, embodiments of the invention may train a model that captures the degree to which competing rules can be trusted relative to one another. In one embodiment, the training may be based on a vetted set of questions and pre-identified flippable words. The rule that most closely identifies the pre-identified flippable word(s), based on the vetting, can be given more weight compared to other rules.

For example, a first training question having a known answer may be analyzed using rules 320. One or more rules may identify several candidate terms (or phrases) as candidates for flipping. The training process may include generating flipped forms of the original first training question by flipping one (or more) word in each version. This process results in a set of competing variants of the first training question. Processing pipeline 300 may process each of these variants using other stages of the pipeline, as well as processing stages of processing pipeline 200 (FIG. 2) to arrive at an answer. For some variants, the arrived-at answer may match the known answer for the first training question, whereas the arrived-at answer may be wrong for other variants. Those rules among rules 320 that yielded variants whose arrived-at answer matches the known answer for the first training question will be emphasized in training the data model. These emphasized rules may then be used in analyzing non-vetted questions. The analysis of non-vetted questions may emphasize, or in some cases rely entirely, on rules that have yielded the correct known answer during the data model training process. In one embodiment, a given rule may be assigned a weight corresponding to how well it predicts an appropriate word or phrase as a flippable word/phrase.

Strong-Versus-Weak Flippable Detection Stage 308 ("Stage 308"):

Stage 308 generally refers to putative identification of words having defined opposites, where the definition may include a "degree of oppositeness." For example, the word pair "poisonous/non-poisonous" may be defined as a strongly flippable word pair, where each word in the pair is defined to have maximum oppositeness in relation to the other. Some words having maximum oppositeness with respect to one another may also be referred to as antonyms. As another example, consider the question "can snakes bite people?" In this example, the word "can" and its implied counterpart, "cannot", describe an aspect of the verb "bite", and are defined as having a weak degree of oppositeness. These relations may be described as weakly flippable strengths for the word pairs. Machine learning techniques may be used to train models 324 to identify, and to detect, strong and weak relationships between word pairs, for example, by using training passages and questions having word pairs whose flippable strengths have been vetted.

Flippable Rule Learner Stage 312 ("Stage 312"):

Given multiple flippable terms identified in a polar question, stage 312 generally determines which flippable term is most significant (impactful towards generating the correct answer) in answering the polar question. In one embodiment, stage 312 does so by training one or more data models 328 using logistic regression. For instance, in a set of three identified flippable words in a vetted question, stage 312 learns which is the most important on the basis of registering how choosing to flip (replacing with an appropriate lexical substitute) a given one of the three words leads the system to generate an answer consistent with the correct answer for the vetted question.

Lexical Substitute Discovery Stage 316 ("Stage 316"):

Generally, stage 316 leverages a large repository of n-gram corpora and respective frequencies, and uses rules designed to determine, for a given word, how to exploit its observed textual contexts in order to find antonyms for it in the corpora. Generally, since flipping a term seeks to reverse the term's polarity, it may be assumed, in some circumstances, that candidates for flipped terms are from a relatively small, fixed set of terms that enumerate mutually exclusive alternatives for a pivot term (a term which, if replaced with a polar lexical substitute, will flip the question's polarity). For example, snakes can be poisonous or non-poisonous; an activity can be legal or illegal; substances can be in a solid, liquid or gas state; an establishment can be in business or out-of-business.

In an embodiment, a large n-gram corpora is searched using a set of patterns, which capture the insight that semantically related alternatives to a lexical form, like the examples above, are likely to appear as alternatives in surface textual contexts. Exploiting such insight makes it possible to identify antonyms pairs. For example, the patterns "* or *", "* and *", "both * and *", "whether * or *" may all match against segments in the n-gram corpora to yield, for instance, textual contexts like " . . . no matter whether salt or fresh water habitats . . . ", or "both poisonous and non-poisonous snakes inhabit the area"—which offer empirical support for polar pairings like "salt water"/"fresh water", or "poisonous"/"non-poisonous."

In some embodiments, in addition to returning antonyms, these patterns may return synonyms as well. Therefore, it may be desirable to supplement their use by employing other lexical resources, such as known antonyms lists, to gather all alternate candidates, deemed desirable for analysis, in a pool, and to apply a classifier trained over synonyms and antonyms, and using n-gram pattern identifiers as features, among others, to filter out the synonyms. The antonyms that remain after the filtering may be considered as descriptors of a space of alternative terms for a flippable term. Each may be used to generate a flipped question. The trained classifier may be referred to as a learned data model 332 for lexical substitute detection.

Referring now to FIGS. 2-3, according to an embodiment of the invention, each set of the original question and its flipped form (there may be as many instances of the flipped question as there are flippable terms) processed by QA processing pipeline 300 are generated as output 399 to QA processing pipeline 200 (FIG. 2), for example, at question and topic analysis stage 220, for further processing.

In an embodiment, QA processing pipeline 200 retrieves relevant passages based on output(s) 399, and uses the context-dependent scorers (textual alignment, string kernel, logical form, and others) in QA processing pipeline 200 as features to train a logistic regression model for determining the answer to the particular polar question.

In other embodiments, the output of QA processing pipeline 300 may be provided as inputs of stages in QA processing pipeline 200 other than question and topic analysis stage 220.

In an embodiment, training data models for processing polar questions may be done using vetted questions having a yes answer; or vetted questions having a no answer.

Figure 4:
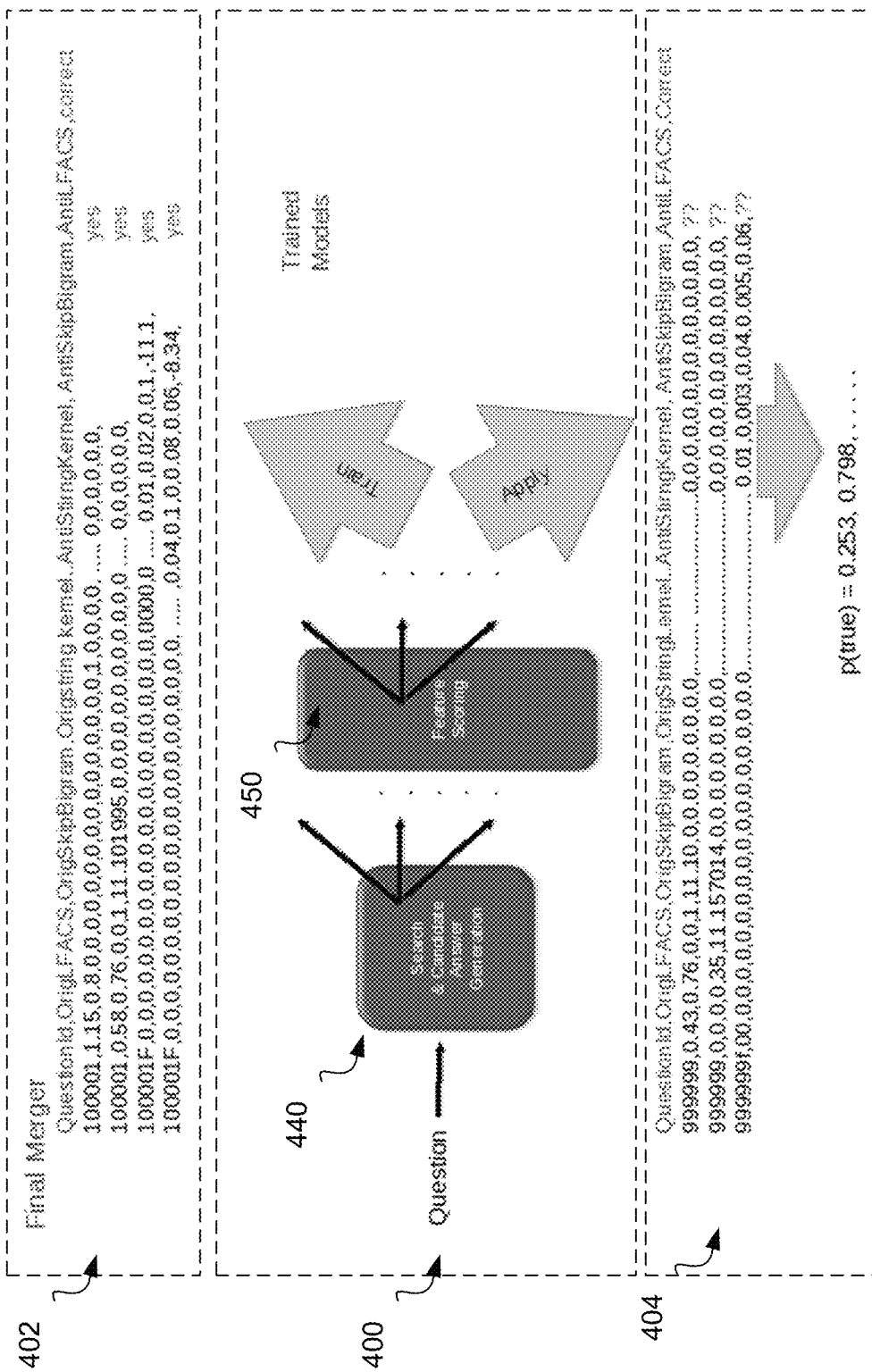
FIG. 4 is a diagram of aspects of the QA systems of FIGS. 2 and 3 involved with machine learning, according to an embodiment of the invention.

FIG. 4 is a diagram of a partial QA processing pipeline 400, according to an embodiment of the invention. QA processing pipeline 400 is a representation of aspects of QA processing pipeline 200 (FIG. 2) and QA processing pipeline 300 (FIG. 3), which may be used in some instances to train various data models used by QA processing pipeline 300.

Referring now to FIG. 4, since in some instances, there may be many versions of the question and its flipped forms (generated using QA processing pipeline 200 and QA processing pipeline 300), it may be desirable to reduce the data noise that may be generated based on too many polar questions (and their opposites) being analyzed. In one embodiment, this issue may be addressed by taking into account confidence scores associated with alternate lexical substitutes. Given multiple flipped questions travelling through QA processing pipeline 200 and QA processing pipeline 300, with provenance of whether each is an original polar question or its flipped version, merging and ranking functions may be performed by using machine learning techniques informed by data models, as follows.

Each set of the original polar question and the flipped questions it has spawned may yield multiple context dependent scores, depending on associated retrieved passages. In an embodiment, a hypothesis that may be relied upon is that: (a) the original polar question with the positive proposition (i.e., the polar question whose answer is yes) returns the higher passages scores, and the corresponding flipped polar questions return low passage scores; and (b) conversely, the original polar question with the negative proposition (i.e., the polar question whose answer is no) returns low passage scores, and the corresponding flipped polar questions return high passage scores.

With continued reference to FIG. 4, QA processing pipeline 400 receives a first question, having a vetted known answer, at the search-and-candidate-answer-generation stage 440 ("stage 440"). The known answer can be referred to as a ground truth that serves as a reference point for training a data model. At this stage, QA processing pipeline 400 generates search queries using terms in the received question, and generates candidate answers corresponding to one or more passages that it retrieves in response to the search queries. QA processing pipeline 400 also receives a set of additional questions that correspond to flipped forms of the received first question.

TABLE 2 provides an example of the first question that QA processing pipeline 400 can receive, along with an illustrative example of a flipped form of the first question. In this case, the received question, identified by Question ID 100001, is "Are vipers poisonous?", having a known answer yes, where poisonous is the flippable term. Its flipped form, identified by Question ID 100001F, is "Are vipers non-poisonous?", where non-poisonous is the flippable word. TABLE 2 also shows reference passages that the first question and its flipped form(s) are analyzed against. TABLE 2 also shows the vetted answer for the first question and its flipped form. Note that in the embodiment depicted in TABLE 2, the vetted answer is yes even for flipped forms of the first question. That is, in each case, the question/flipped question are assumed to support finding a yes answer to the first question.

As shown in FIG. 4 and TABLE 2, Question 100001 is analyzed at the feature scoring stage 450 ("stage 450") by applying several (possibly hundreds) feature scoring algorithms to the pairing of the question and a corresponding reference passage. For example, a set of scorers analyze Question 100001 in relation to Passage 1. The same scorers may be used in stage 450 to analyze Question 100001 in relation to Passage 2, and any other passage generated at stage 440. The same process may be repeated for Question 100001F; the flipped question can be analyzed at stage 450 by scoring algorithms in connection with Passages 3 and 4 (these are passages generated for the flipped question at stage 440).

TABLE 2

EXAMPLES OF A VETTED QUESTION & ITS FLIPPED FORMS WITH KNOWN ANSWERS

| Question ID | Reference Passage | Question Text | Vetted Answer |
|---|---|---|---|
| 100001 | Passage 1 | Are vipers poisonous? | Yes |
| 100001 | Passage 2 | Are vipers poisonous? | Yes |
| ... | | | |
| 100001F | Passage 3 | Are vipers non-poisonous? | Yes |
| 100001F | Passage 4 | Are vipers non-poisonous? | Yes |

Each analysis step at stage 450 with respect to each pairing of Question 100001 and a corresponding passage, as well as each paring of Question 100001F and a corresponding passage, yields a vector of context-dependent scores. Examples of vectors of context dependent scores for a vetted set of questions having known answers are illustrated at section 402 in FIG. 4.

Context dependent scores are generated by context-dependent scorers; algorithms designed to evaluate question features. In this embodiment, there are two sets of scores: those beginning with "Orig[Feature Name]", such as "OrigLFACS", and those beginning with "Anti[Feature Name]", such as "AntiStringKernel". All scorers can be applied to the first question and each of its flipped forms in relation to their corresponding passages. The result of applying the scorers to pairs of the first question and corresponding passages, as well as pairs of the flipped form(s) of the first question and corresponding passages, yields a score vector for each analysis.

Based on these score vectors, a logistic regression model can be trained to determining the yes or no answer for a particular question.

For example, consider the score vector for the question in TABLE 2 having a known yes or correct answer. The score vector for this question includes individual scores derived from corresponding context-dependent scorers (denoted by OrigLFACS and OrigSkipBigram, etc.), for the polar question, and scores derived from the flipped versions of context-dependent scorers (denoted by AntiOrigLFACS and AntiOrigSkipBigram, etc.). The scores determined for the polar question using the "Orig" set of scorers includes several scores above (0), whereas the scores for the corresponding "Anti" scorers are generally (0). For the flipped version of the question, the opposite is generally true.

Through a merging process, QA processing pipeline 400 (or another processing pipeline) merges the context dependent scores generated at stage 450. In one embodiment, the merging is performed by summing all vector scores for the given question and its flipped form(s). The resulting vector may include the same number of elements as the vectors to be summed, where each element of the resulting vector is a sum of all corresponding elements in the vectors to be summed. The merged vector is associated with the ground truth of the first question.

The same process may be performed using other flipped forms of the first question, each having its own vector and a corresponding answer. The score vectors may be used to train a data model (for example, using logistic regression) that more accurately identifies the ideal flippable terms, by emphasizing the impact of scores derived by particular scorers. In other words, a scorer whose analysis of a vetted question having a known answer results in a merged vector having a high score is given more weight during the data model training process, such that analysis of other questions not having a known answer will emphasize the scorers having a higher weight.

With continued reference to FIG. 4, component 404 depicts an analysis of a new question having Question ID 999999. This new question is not vetted, and may not have a known answer. Based on training a data model as described above, QA processing pipeline 400 applies, at stage 450, the scoring algorithms "Orig" and "Anti" to the new question in relation to passages retrieved at stage 440. QA processing pipeline 400 repeats this process for flipped forms of the new question. By applying the data model developed during the training phase to the scores determined for the new question, QA processing pipeline 400 determines whether the answer to the polar question is yes or no, and generates final answers and confidence scores for communication to a user.

Figure 5:
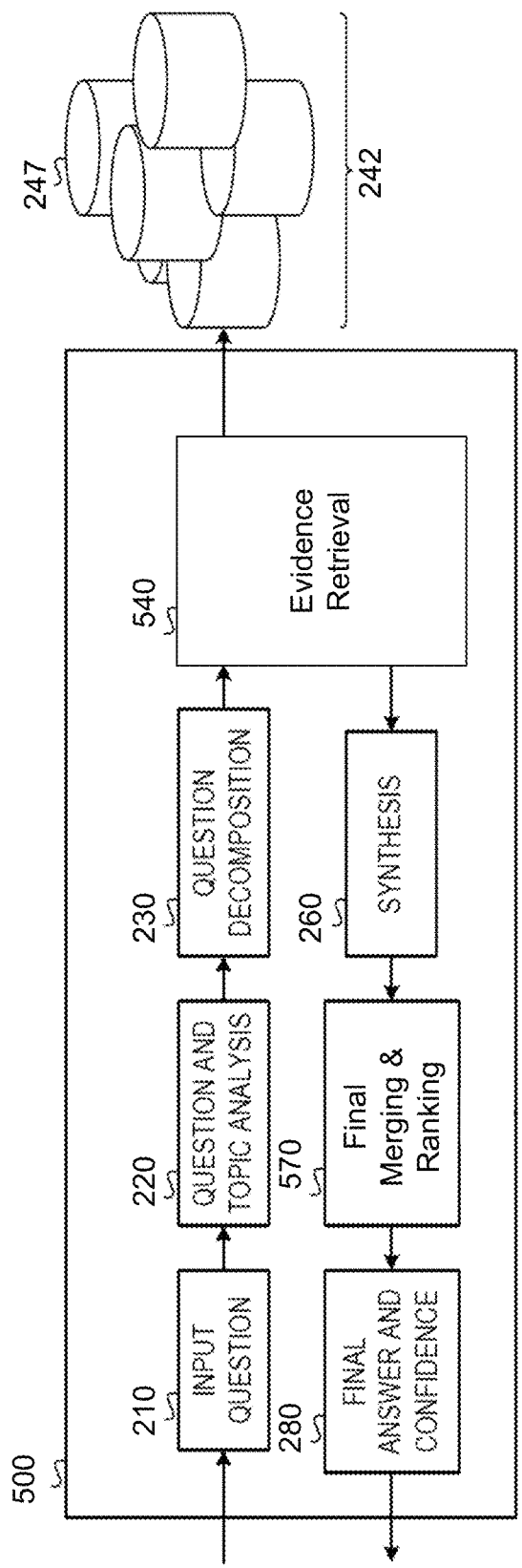
FIG. 5 is a functional block diagram of a QA processing pipeline for answering a natural language question in yes or no format, in NLP computing environment of FIG. 1, according to an embodiment of the invention.

FIG. 5 is a functional block diagram of a QA processing pipeline 500 for answering a natural language question, in NLP computing environment 100 of FIG. 1, according to an embodiment of the invention. QA processing pipeline 500 is a variant of QA processing pipeline 200. Accordingly, like elements are similarly referenced in both Figures, and can perform the same functions.

Referring now to FIG. 5, QA processing pipeline 500 may have specific applications for processing polar questions having yes or no answers. In particular, rather than generate hypothesis at processing stage 240 (as is the case in QA processing pipeline 200), QA processing pipeline 500 can forgo hypothesis generation, as there are only two possible answers to the question: yes and no. Therefore, QA processing pipeline 500 may use the output of stage 230 to run a query at evidence retrieval stage 540 ("stage 540"), score the evidence, and proceed to stage 260.

Additionally, at the final merging and ranking stage 570 ("stage 570"), QA processing pipeline may perform merging and ranking functions described in connection with stage 270 of QA processing pipeline 200 (FIG. 2), and utilize the analysis performed by QA processing pipeline 400 (FIG. 4) prior to providing a final answer and confidence score at stage 280. At stage 570, QA processing pipeline 500 may use a variety of features to perform the final merging and ranking, including those derived from QA processing pipeline 300 (FIG. 3).

Figure 6:
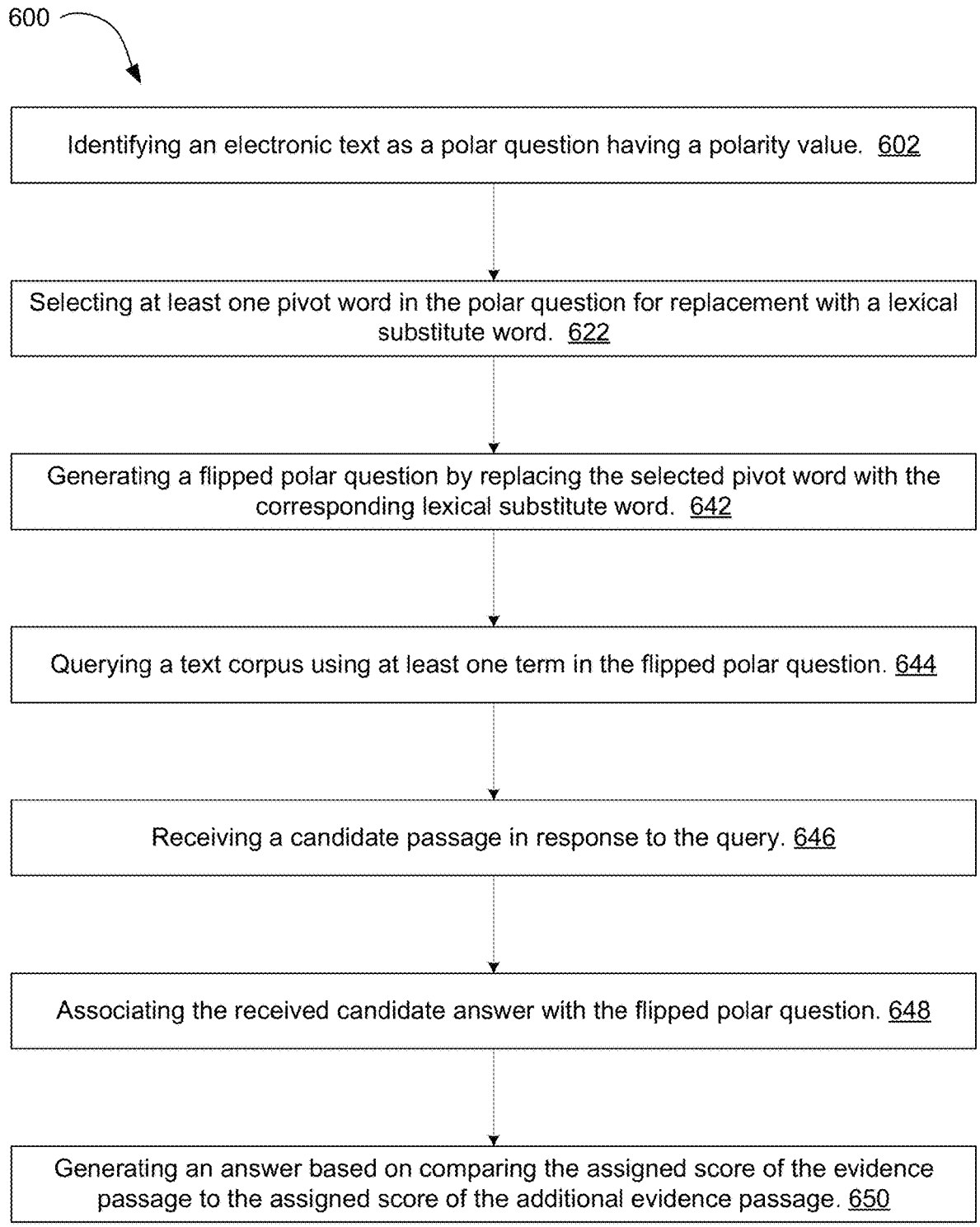
FIG. 6 is a flowchart of a method for answering a polar natural language question using the processing pipelines of FIGS. 2 and 3, according to an embodiment of the invention.

FIG. 6 is a flowchart of a method 600 for answering a polar natural language question using the QA systems of FIGS. 2-5, according to an embodiment of the invention. Steps of method 600 may be provided by program code executable by one or more processors of one or more computing devices. In an embodiment, the program code is part of processing pipeline 106, and is executable by processor 104 of computer 102 in NLP computing environment 100 (FIG. 1).

Referring now to FIGS. 1-6, computer 102 receives an electronic text input from a user via an input device (not shown). The electronic text input may be in the form of a natural language question ("the input question"). QA processing pipeline 200 receives the question, and performs initial processing using stage 210. QA processing pipeline 200 identifies (step 602), at stage 210 (or at another stage; for example, at a processing stage of QA processing pipeline 300) that the input question is a polar question (hereinafter, "the polar question", "the original polar question", or "the first polar question").

Generally, in an embodiment, detecting a polar word in the electronic text is based on the polar word matching at least one criterion for a polar term. Identifying the electronic text as a polar question is based on detecting the polar word. In one embodiment, the identification may be performed by QA processing pipeline 200, and upon a positive identification, further processing based on textual polarity of the question may be performed by QA processing pipeline 300. In this embodiment, textual polarity analysis may be avoided if the question is identified as non-polar. However, in another embodiment, it may be desirable to process the question using QA processing pipeline 300 routinely, without QA processing pipeline first identifying the question as a polar question. This may be desirable where, for example, a question's textual polarity is ascertainable even if the question itself is not strictly polar.

Based on identifying the question as polar, QA processing pipeline 200 provides the identified polar question to QA processing 300 as input 301 for further processing. QA processing pipeline 300 receives input 301 and performs further processing using one or more of its stages.

Generally, QA processing pipeline 300 selects (step 622) at least one pivot word in the polar question for replacement with a lexical substitute word. The at least one pivot word is selected such that replacing it in the polar question with the lexical substitute word flips the polarity value of the polar question. The selection process may be implemented using one or more stages in QA processing pipeline 300. For example, at stage 304, QA processing pipeline 300 may use sub-tree pattern matching rules 320 to evaluate words or phrases in the input question to select one or more candidate pivot words. Words that satisfy a certain set of vetted rules may be selected as pivot words (vetting may be performed using a training set of polar questions having known answers). This process may include generating a predicate-argument structure (PAS) for the polar question, comparing a pattern in the PAS to one or more patterns in a set of pattern matching rules (where the set of pattern matching rules comprising predetermined PAS patterns), and selecting the at least one pivot word based on the comparison resulting in a match between the pattern in the PAS to at least one of the one or more patterns in the set of pattern matching rules.

The selection process (step 622) may also include analyzing potential flippable words at stage 308 based on strongly versus weakly flippable words detected. The processing at this stage can improve the choice of which word or words (or phrases) in the polar question should be selected for flipping. For example, if a word is determined to be strongly flippable, it is more likely to have an impact on the polarity value of the polar question, and may be a more desirable choice for selection.

The selection process (step 622) may also include analyzing potential flippable words at stage 312 based on data models 328 trained using vetted questions and answers. For example, if a given word, phrase, or word/phrase type has been identified as a strong candidate for flipping in data model training processes, these data models can inform the selection of the pivot word in the polar question (for example, if they share a set of features exceeding a threshold value).

According to an embodiment, the selection (step 622) may include receiving a ranked set of one or more candidate pivot words based on a machine learning model. The ranked set may include n candidate pivot words. QA processing pipeline 200 may generate a set of flipped polar questions by replacing at least one candidate pivot word with a lexical substitute word.

QA processing pipeline 300 may generate a flipped polar question (step 642) by replacing the selected pivot word with a corresponding lexical substitute word. Identifying a suitable lexical substitute word may be performed at stage 316 of QA processing pipeline 300, using learned models 332 for lexical substitute detection. Each candidate pivot word may compete with the other candidates in other stages of QA processing pipelines in NLP environment 100 (FIG. 1), such as during scoring, merging, and ranking stages. In other words, candidate pivot words may be used for generating (step 622) at least an additional flipped polar question by replacing the selected candidate pivot word with a lexical substitute word. The additional versions can compete with one another in other processing stages, where the evidence returned for the highest scoring version, for example, may be used to answer the original polar question. The same competition process may be used to train the various rules and data models used in QA processing pipeline 300.

Additionally, generating (step 622) at least an additional flipped polar question may be performed by replacing selected candidate pivot words with alternate lexical substitutes to generate additional versions of the original polar question. These additional flipped polar questions too may compete against one another in other stages of processing pipelines.

Accordingly, QA processing pipeline may output one or more polar questions (for example, one or more versions of the original polar question with at least one word flipped) as output 399, for further processing by other processing pipelines.

Using output(s) 399 of QA processing pipeline 300, QA processing pipeline 200 may query (step 644) text corpus 242, for a given polar question/flipped polar question, using at least one search term from that question. QA processing pipeline 200 may receive (step 646) one or more candidate passages in response to the query. QA processing pipeline 200 may associate (step 648) one or more of the received candidate passages with corresponding one or more polar questions (including, for example, the original polar question and one or more of its flipped versions). QA processing pipeline 200 may provide the original question, its flipped versions, and their associated evidence passages, to other processing stages for further analysis, as described in connection with FIG. 2, above. For example, in an embodiment, QA processing pipeline 200 may assign a score to the evidence passage based on the passage meeting a set of query criteria, as determined by a context-dependent scorer (FIG. 2).

QA processing pipeline 200 may generate an answer (step 650) based on comparing the assigned scores of the various evidence passages to one another, using one or more processing stages such synthesis stage 260, final confidence ranking stage 270, and final answer and confidence stage 280. For example, QA processing pipeline 200 may generate an answer by processing a set of pairs of a question and an answer (for example, the original polar question and one or more evidence passages, and similar pairs for flipped versions of the original polar question) using a merging and ranking stage of a natural language processing pipeline.

In an embodiment, generating an answer (step 650) includes scoring at least the polar question and at least one flipped polar question to generate a set of score vectors, merging the score vectors, analyzing the merged score vectors to a model generated by a machine learning engine, and generating the answer based on the analyzing (for example, as described in connection with FIG. 4, above).

Figure 7:
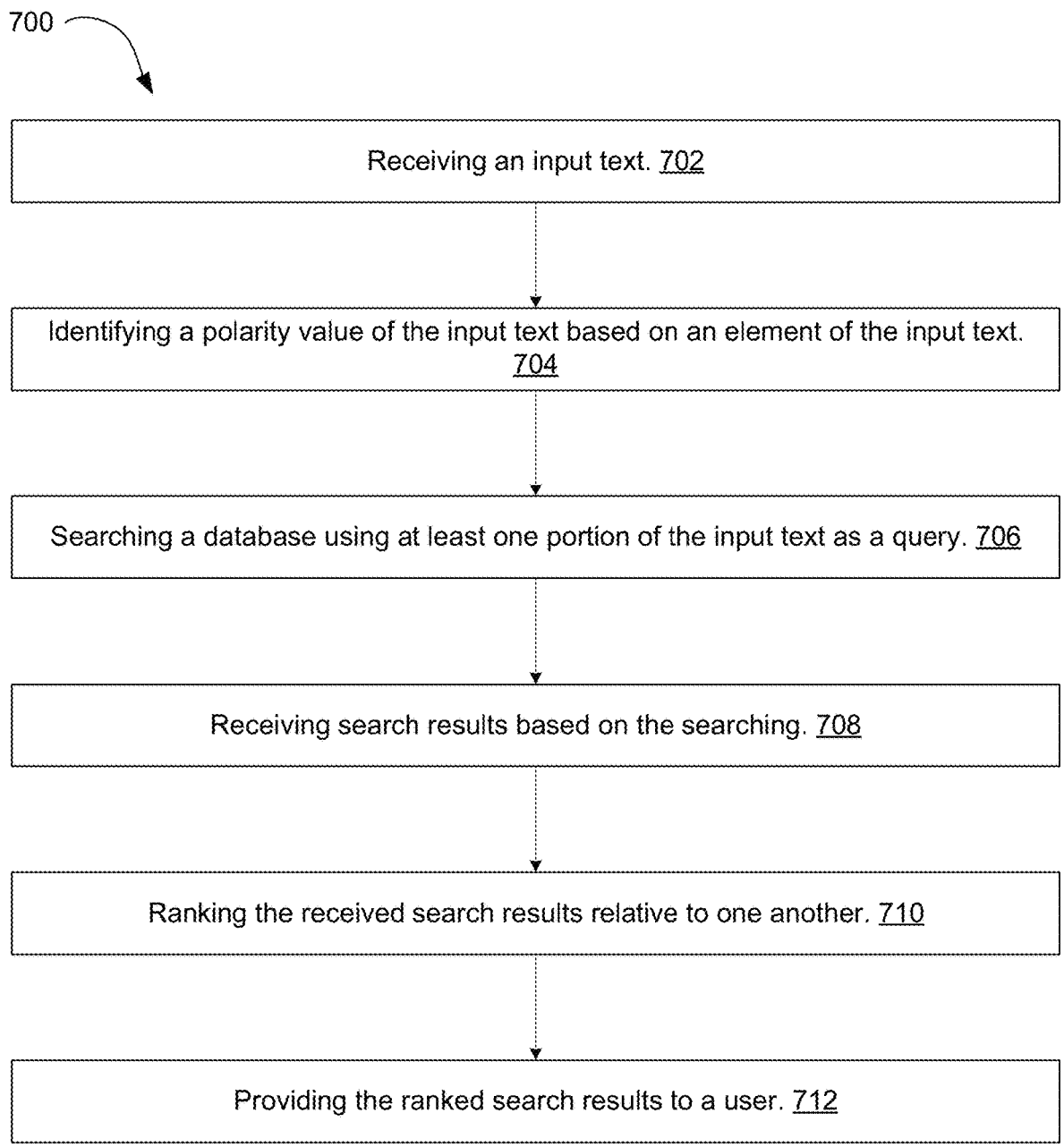
FIG. 7 is a flowchart of a method for performing a search using a polarity aware search engine, according to an embodiment of the invention.

FIG. 7 is a flowchart of a method 700 for performing a search using a polarity aware search engine, for example in the NLP computing environment of FIG. 1, according to an embodiment of the invention. Steps of method 700 may be provided by program code executable by one or more processors of one or more computing devices. In an embodiment, the program code includes instructions executable by processor 104 of computer 102 in NLP computing environment 100 (FIG. 1). Aspects of the polarity aware search engine may be similar to any search engine known in the art.

The polarity aware search engine may perform a textual query, as follows. The polarity aware search engine receives (step 702) an input text, for example from a user interacting with the polarity aware search engine via a browser application on a client computer. The polarity aware search engine identifies (step 704) a polarity value of the input text based on an element of the input text. In an embodiment, the polarity aware search engine does so by providing the input text to an NLP pipeline (such as QA processing pipelines 200/300 of FIGS. 2 and 3), or a stage thereof provided as a service via a cloud platform (as described in connection with FIGS. 8-10, below). The NLP pipelines identifies polar terms in the text as described in connection with FIGS. 2-3, above.

The polarity aware search engine also searches (step 706) a database using at least one portion of the input text as a query. In a related embodiment, the search engine may also generate a modified electronic input text by replacing the element with a lexical substitute, and perform the query based on at least one portion of the modified input text. The search engine may also perform the search by including terms from both the input text and the modified input text.

In response to the search query, the polarity aware search engine receives (step 708) search results based on the searching.

The polarity aware search engine may rank (step 710) the received search results relative to one another based on a variety of ranking algorithms, as may be done with any search engine known in the art, and may further provide (step 712) the ranked search results to a user.

The ranking may additionally take into consideration the polarity value of the input text relative to polarity values of the received search results. The polarity aware search engine may do so by analyzing the search results, prior to presentation to the user, using NLP pipelines described in connection with FIGS. 2-3 above, using similar techniques that the polarity aware search engine uses to determine the polarity value of the input text.

In an embodiment, the polarity aware search engine may exclude from search results at least one search result having a polarity value that is opposite to the polarity value of the input text.

In an embodiment, the NLP pipeline queries a database using one or more words in the input text, receiving one or more candidate passages in response to the query, and scores the one or more candidate passages. The ranked list may reflect this scoring, where higher scoring passages are shown with greater prominence (for example, they are presented before lower scoring passages, or are graphically highlighted or distinguished in some way).

According to an illustrative example, a user accesses the search engine via a web browser. The user enters the search phrase, "symptoms of high cholesterol". In this example, the polarity aware search engine may identify high as a polarity value associated with the search phrase. The polarity aware search engine may query a variety of data sources. The query may return various passages that mention high as well as low cholesterol levels. Since the polarity aware search engine is aware of textual polarity, it can modify its search results to, for example, exclude those results that discuss low cholesterol levels, or to display them as less relevant to the search phrase.

Referring now generally to FIGS. 1-7, embodiments of the invention may provide general NLP with textual polarity awareness. That is, polarity-aware NLP is not constrained to the context of search engines or QA processing pipelines, but has applicability to NLP contexts in general.

Accordingly, an NLP method (not shown) for detecting polarity of a text element in an NLP system may receive an input text, for example from a user or a process (such as an NLP pipeline). The method identifies a polarity value of the input text based on an element of the input text. In an embodiment of the method, the polar value of the input text is based on a polarity value of a word in the input text having a defined antonym. For example, if the sentence includes the word "high" having a known antonym "low", this may be identified as a text element that is indicative of polarity; the polarity value of the input text may be set to high. The method queries a data corpus using on one or more terms in the input text. The query returns evidence passages that the method scores, relative to the input text.

The method determines polarity values of the retrieved evidence passages. The scoring is based in part on a comparison of the polarity values of the plurality of evidence passages relative to the input text.

Identifying the polarity of the input text may include detecting a polar word in the input text based on the polar word matching at least one criterion for a polar term, and identifying the polar value of the input text based on the detecting. Detecting the polar value of the input text may be based on generating a PAS for the input text, and comparing a pattern in the PAS to one or more patterns in a set of pattern matching rules. The set of pattern matching rules may include predetermined PAS patterns. The method may identify at least one polar word based on the comparing resulting in a match between the pattern in the PAS to at least one of the one or more patterns in the set of pattern matching rules. The method may also associate the polarity value of the at least one polar word with the polarity value of the input text.

The method may generate a modified electronic input text by replacing the element with a lexical substitute. The modified electronic input text may be used in support of various NLP tasks, such as QA analysis.

It should be noted that natural language processing informed by textual polarity can improve, but is distinct from sentiment analysis. According to one definition, sentiment analysis refers to the process of identifying and extracting subjective information in opinion text. For example, sentiment analysis can be used to identify and aggregate sentiments expressed in online product reviews. Sentiments may be categorized as positive, neutral, or negative.

On the other hand, according to embodiments of the invention, natural language processing informed by textual polarity identifies whether one or more text elements, such as a word, are polar according to the definitions provided above, independently of subjective expression in opinion text. Additionally, embodiments of the invention recognize that traditional NLP techniques can be improved by detecting polarity shifts in text; reformulating a given text to reflect its polar opposite or a polar variant can improve processing. As an example, QA systems described above benefit from polarity-aware NLP by retrieving evidence passages using not only an original input question, but also its polar variants.

Figure 8:
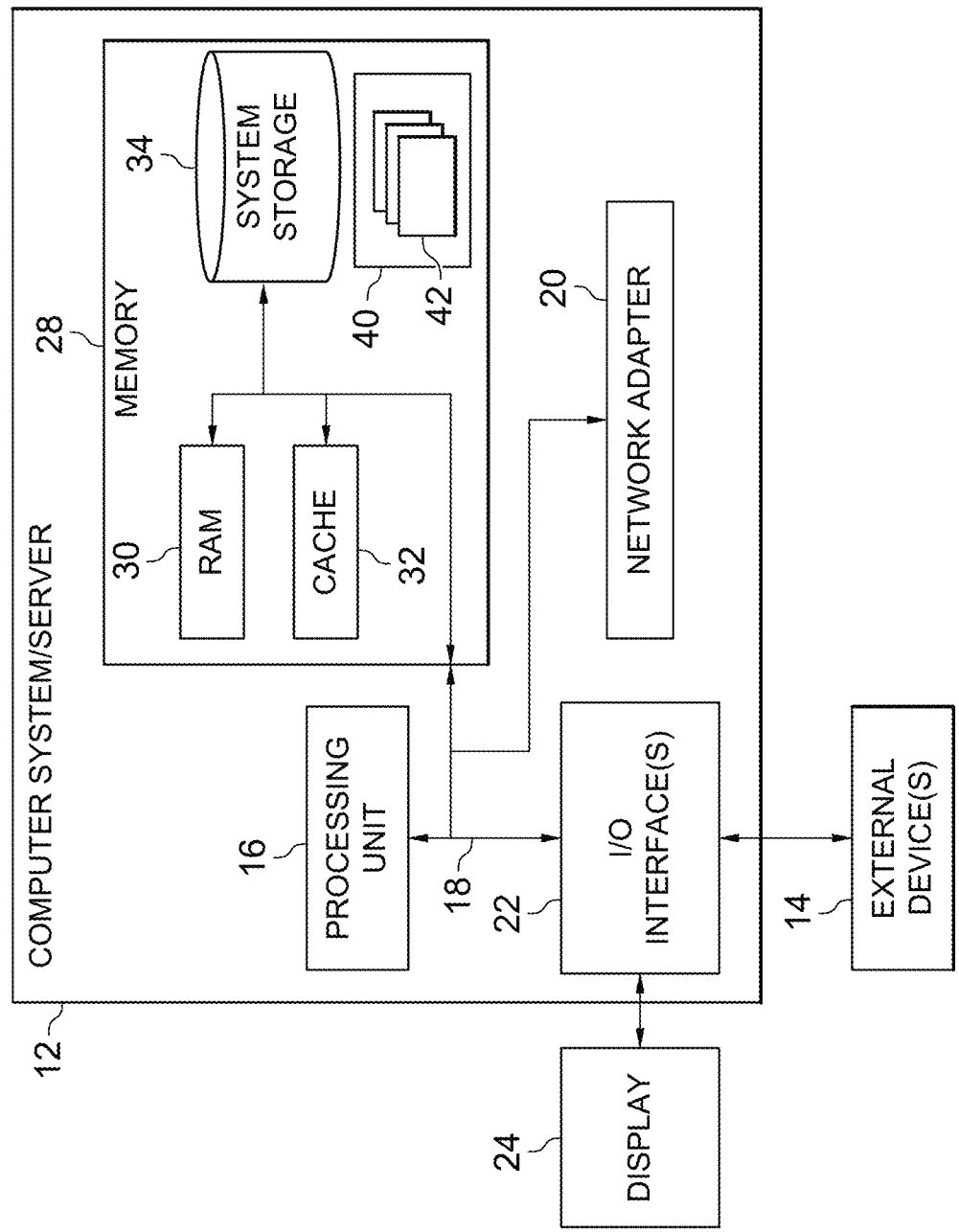
FIG. 8 is functional block diagram of a computing node in the NLP computing environment of FIG. 1, according to an embodiment of the invention.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
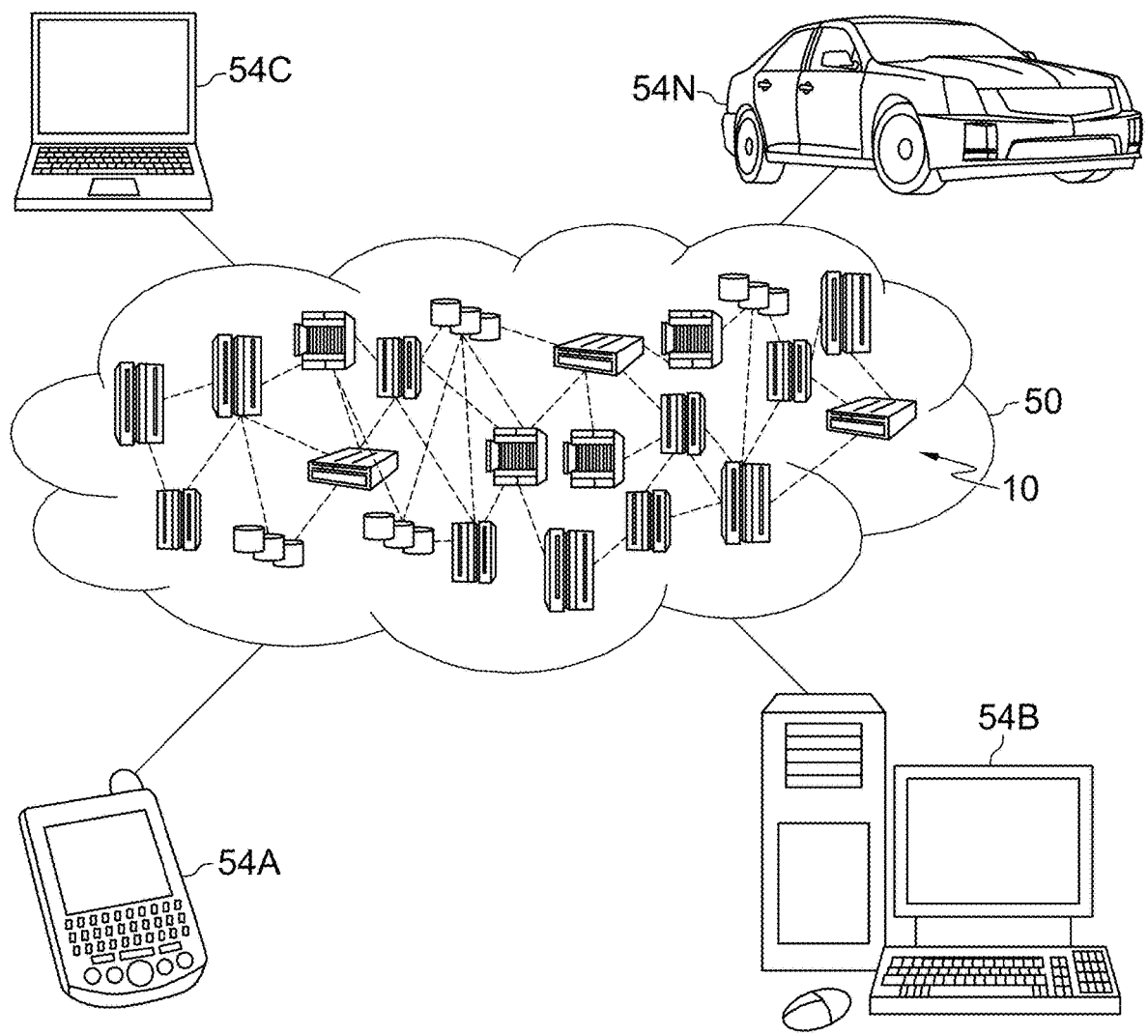
FIG. 9 is a functional block diagram of a cloud-computing environment including the computing node of FIG. 8, according to an embodiment of the invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that cloud computing nodes 10 and cloud computing environment 50 can communicate with any type of computerized device over any type of network and/or network addressable connection (e.g., using a web browser).

Figure 10:
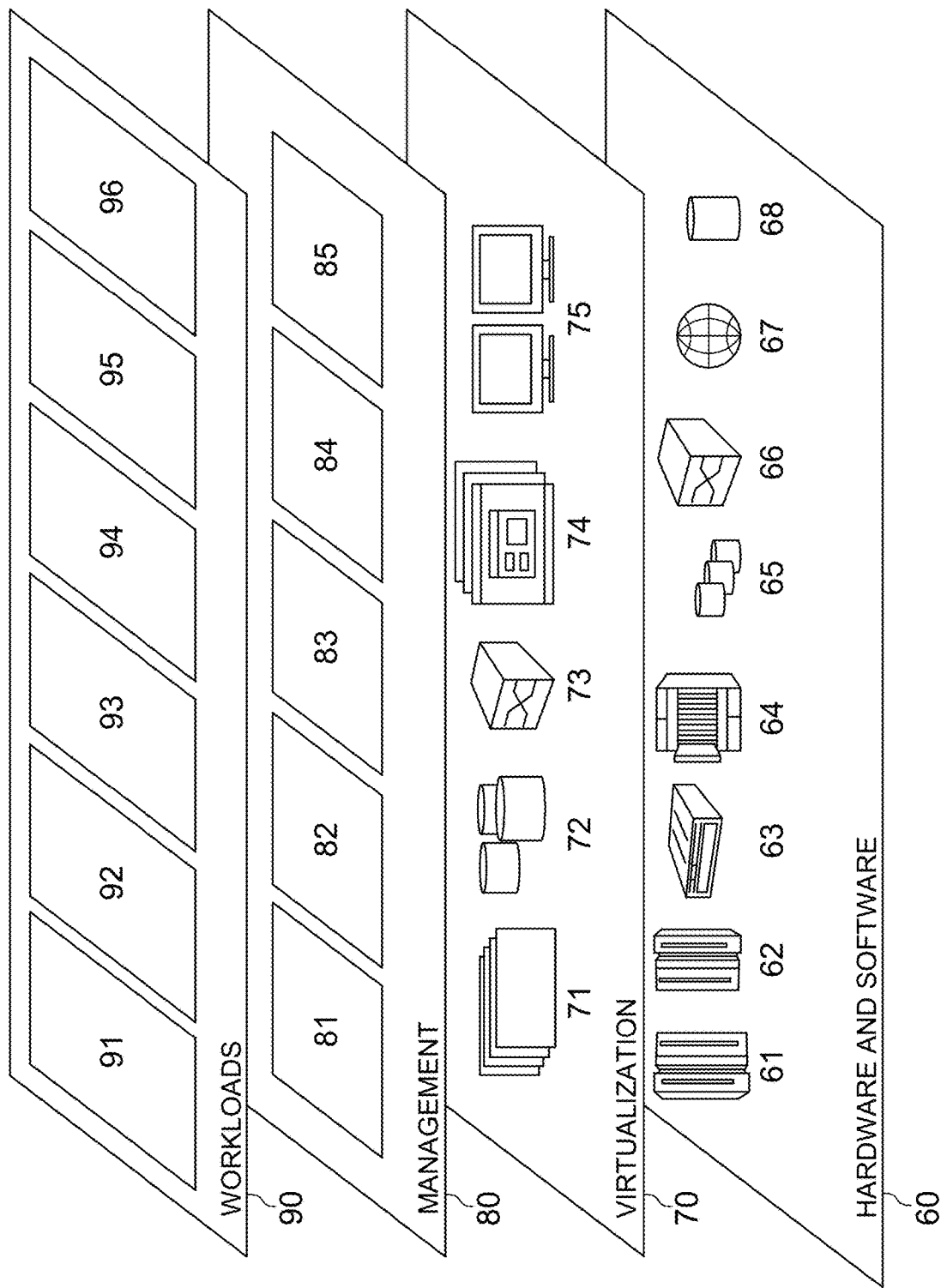
FIG. 10 is a set of functional layers for implementing the cloud-computing environment of FIG. 9, according to an embodiment of the invention.

Referring now to FIG. 10, a set of functional abstraction layers provided by cloud computing environment 50 (FIG. 9) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and NLP processing pipelines, including those described in connection with FIGS. 1-7.

Referring now generally to embodiments of the invention, the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for performing a textual query by a search engine, comprising:

receiving an electronic input text having a polarity value;

identifying the polarity value of the electronic input text based on a polarity of a textual element of the electronic input text, wherein the identifying is based on determining that a change in the polarity of the textual element changes the polarity of the electronic input text and wherein the polarity of the textual element gives a meaning to the electronic input text;

generating a modified electronic input text by replacing the textual element of the electronic input text with a lexical substitute; wherein a polarity value of the modified electronic input text is different from the polarity value of the electronic input text, and wherein a meaning of the modified electronic input text is different from the meaning of the electronic input text;

searching a database using at least a portion of the modified electronic input text as a query; and receiving search results based on the searching.

2. The method of claim 1, further comprising:

ranking the received search results relative to one another.

3. The method of claim 2, wherein the ranking is based on the polarity value of the electronic input text relative to polarity values of the received search results.

4. The method of claim 2, further comprising:

excluding from search results at least one search result having a polarity value that is opposite to the polarity value of the electronic input text.

5. The method of claim 2, wherein identifying the polarity value of the electronic input text comprises:

detecting a polar word in the electronic input text based on the polar word matching at least one criterion for a polar term; and identifying the polarity value of the electronic input text based on the detecting.

6. The method of claim 2, wherein identifying the polarity value of the electronic input text is based on:

generating a predicate-argument structure (PAS) for the electronic input text;

comparing a pattern in the PAS to one or more patterns in a set of pattern matching rules, the set of pattern matching rules comprising predetermined PAS patterns; and identifying at least one polar word based on the comparing resulting in a match between the pattern in the PAS to at least one of the one or more patterns in the set of pattern matching rules.

7. The method of claim 1, further comprising:

querying a database using one or more words in the electronic input text;

receiving one or more candidate passages in response to the query; and scoring the one or more candidate passages.

* * * * *